(12) United States Patent
Hata et al.

(10) Patent No.: US 10,780,771 B2
(45) Date of Patent: Sep. 22, 2020

(54) DRIVE DEVICE FOR HYBRID VEHICLE

(71) Applicant: TOYOTA JIDOSHA KABUSHIKI KAISHA, Toyota-shi, Aichi-ken (JP)

(72) Inventors: Kensei Hata, Sunto-gun (JP); Hideaki Komada, Gotemba (JP); Akiko Nishimine, Susono (JP); Akira Murakami, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 91 days.

(21) Appl. No.: 16/152,752

(22) Filed: Oct. 5, 2018

(65) Prior Publication Data

US 2019/0118639 A1 Apr. 25, 2019

(30) Foreign Application Priority Data

Oct. 20, 2017 (JP) ................................ 2017-203272

(51) Int. Cl.
| | |
|---|---|
| *B60K 6/445* | (2007.10) |
| *B60K 6/40* | (2007.10) |
| *B60K 6/365* | (2007.10) |
| *B60K 6/26* | (2007.10) |
| *F16H 37/08* | (2006.01) |

(52) U.S. Cl.
CPC ............... *B60K 6/445* (2013.01); *B60K 6/26* (2013.01); *B60K 6/365* (2013.01); *B60K 6/40* (2013.01); *F16H 37/0806* (2013.01); *F16H 37/0833* (2013.01); *B60K 2006/266* (2013.01); *B60Y 2200/92* (2013.01)

(58) Field of Classification Search
CPC .................................. B60K 6/445; B60K 6/40
See application file for complete search history.

(56) References Cited

U.S. PATENT DOCUMENTS

| 5,775,449 A * | 7/1998 | Moroto ................. B60K 6/365 |
| | | 180/65.235 |
| 7,367,910 B2 * | 5/2008 | Schmidt ................ B60K 6/365 |
| | | 475/317 |
| 8,226,513 B2 * | 7/2012 | Abe ........................ B60L 50/16 |
| | | 475/5 |
| 9,604,529 B2 * | 3/2017 | Choi ........................ B60K 6/52 |
| (Continued) |

FOREIGN PATENT DOCUMENTS

| JP | H03-117752 A | 5/1991 |
| JP | H09-226392 A | 9/1997 |
| (Continued) |

*Primary Examiner* — Sherry L Estremsky
(74) *Attorney, Agent, or Firm* — Oliff PLC

(57) ABSTRACT

A drive device for a hybrid vehicle includes an engine, a first motor, a power split device, a second motor, a first speed reduction unit, a second speed reduction unit, and a differential gear. The first motor generates electric power. The power split device splits drive power output from the engine to the first motor side and a drive wheel side. The second motor increases or decreases torque output from the power split device and to be transmitted to the differential gear. The second motor is coupled to a sun gear. The first speed reduction unit is coupled to the sun gear. The second speed reduction unit is provided between the first speed reduction unit and the differential gear. The differential gear transmits torque to the drive wheel.

10 Claims, 23 Drawing Sheets

(56) References Cited

U.S. PATENT DOCUMENTS

| | | |
|---|---|---|
| 9,834,080 B2 * | 12/2017 | Ahn ................ B60K 6/365 |
| 2009/0301800 A1 | 12/2009 | Oba et al. |
| 2013/0102430 A1 | 4/2013 | He et al. |
| 2015/0184732 A1 | 7/2015 | Lee et al. |
| 2018/0208177 A1 * | 7/2018 | Hata ................ B60K 6/365 |
| 2019/0275877 A1 * | 9/2019 | Rowa ............... B60W 20/40 |
| 2019/0351894 A1 * | 11/2019 | Nakagawara ....... B60W 10/06 |

FOREIGN PATENT DOCUMENTS

| JP | H10-246173 A | 9/1998 |
|---|---|---|
| JP | 2001-260669 A | 9/2001 |
| JP | 4222406 B2 | 2/2009 |
| JP | 2014-084000 A | 5/2014 |
| KR | 10-2015-0078779 A | 7/2015 |

\* cited by examiner

DRIVE DEVICE FOR HYBRID VEHICLE

INCORPORATION BY REFERENCE

The disclosure of Japanese Patent Application No. 2017-203272 filed on Oct. 20, 2017 including the specification, drawings and abstract is incorporated herein by reference in its entirety.

BACKGROUND

1. Technical Field

The present disclosure relates to a drive device for a hybrid vehicle including an engine and a motor as a drive power source.

2. Description of Related Art

Japanese Unexamined Patent Application Publication No. 9-226392 (JP 9-226392 A) discloses a drive device for a hybrid vehicle which is a drive device of a type of transmitting both of torque output from an engine and torque output from a motor to drive wheels. The configuration of the drive device will be described. A first motor, a drive sprocket, a power split device, and a second motor are disposed on the same axis as an engine and disposed in this order from the engine side. The power split device is a single-pinion planetary gear mechanism, the engine is coupled to a carrier, the first motor is coupled to a sun gear, torque is output from a ring gear, and the second motor is coupled to the ring gear. A driven sprocket is attached to a first counter shaft disposed in parallel with the drive sprocket, whereby a chain is wound on both sprockets. In addition, a first drive gear is attached to the first counter shaft, and a first driven gear that meshes with the first drive gear is attached to a second counter shaft disposed in parallel with the first counter shaft. A second drive gear that rotates along with the first driven gear is attached to the second counter shaft, and the second drive gear meshes with a ring gear of a differential gear.

Accordingly, in the drive device described in JP 9-226392 A, gear shift action in the power split device, speed reduction action of a chain mechanism, speed reduction action between the first drive gear and the first driven gear, and speed reduction action between the second drive gear and the ring gear of the differential gear occur, and four gear shift units (speed reduction units) are provided. In the drive device described in JP 9-226392 A, the first counter shaft and the second counter shaft are provided, and two gear (parallel gear) speed reduction mechanisms are provided on an output side (on a downstream side in a transmission direction of torque) of the chain mechanism. Accordingly, even though a rotation direction is not reversed with the chain mechanism, the two gear (parallel gear) speed reduction mechanisms are provided, whereby it is possible to make a rotation direction of the ring gear in the differential gear be a forward rotation direction (the same direction as input rotation).

Japanese Unexamined Patent Application Publication No. 2001-260669 (JP 2001-260669 A) describes a drive device having a configuration in which a planetary gear mechanism as a power split device and a first motor are disposed on the same axis as the engine in the order from the engine side, and an output gear coupled to an output element of the planetary gear mechanism is disposed between the engine and the planetary gear mechanism. In the drive device described in JP 2001-260669 A, a counter gear meshes with the output gear, a ring gear of a differential gear meshes with the counter gear, and a drive gear that is attached to a rotor shaft of a second motor disposed in parallel with the first motor meshes with the counter gear. Accordingly, similarly to the device described in JP 9-226392 A, in the drive device described in JP 2001-260669 A, gear shift action in the power split device, speed reduction action between the output gear and the counter gear, speed reduction action between the counter gear and the ring gear, and speed reduction action between the drive gear of the second motor and the counter gear occur, and four gear shift units (speed reduction units) are provided.

Japanese Unexamined Patent Application Publication No. 10-246173 (JP 10-246173 A) describes a gear shift mechanism constituted of two planetary gear mechanisms, and Japanese Unexamined Patent Application Publication No. 3-117752 (JP 3-117752 A) describes an automatic transmission using a Ravigneaux planetary gear mechanism. In the JP 10-246173 A and JP 3-117752 A, the automatic transmission is configured to output torque from a ring gear.

SUMMARY

The drive device described in JP 9-226392 A or JP 2001-260669 A is a drive device of a so-called series-parallel type, and is configured to make the first motor function as a power generator in addition to transmitting drive power of the engine to the drive wheels and make the second motor function as a motor with electric power of the first motor to transmit output torque of the second motor to the drive wheels. A so-called electric vehicle (EV) mode in which the engine is stopped and traveling is enabled solely with drive power output from the second motor may be set. As described above, while the second motor needs to output drive power for traveling, the size of the second motor increases with an increase in output torque; thus, there is room for improvement in in-vehicle properties. For this reason, as described in JP 9-226392 A or JP 2001-260669 A, in a case where three speed reduction mechanisms are provided between the second motor and the drive wheels to make a speed reduction ratio (amplification ratio of torque) large, it is possible to achieve reduction in size of the second motor. While a radius of a rotating element, such as a drive-side (input-side) gear, is made small and a radius of a rotating element, such as a driven-side (output-side) gear, is made large, the greater the radius difference (or a gear ratio) between the rotating elements, the greater the speed reduction ratio becomes. However, in a case where the radius difference (or the gear ratio) is made large, an inter-axis distance that is an interval between the rotation center axes of the rotating elements is extended, and the device is increased in size. In contrast, as described in JP 9-226392 A or JP 2001-260669 A, the speed reduction mechanisms are provided in multiple stages (three), whereby it is possible to make the speed reduction ratio large. However, in a case where three parallel gear type speed reduction mechanisms are provided in series, a space is made large for this reason, and it is difficult to achieve reduction in size of the drive device.

An engine and a motor constituting a power source of a hybrid drive device have a difference in output characteristics of torque, and in a case where a speed reduction ratio of a speed reduction mechanism provided on an output side of the motor is made large to reduce the size of the motor, the difference in output torque becomes more conspicuous. In this case, a desirable speed reduction ratio in a power transmission system from the engine to the drive wheels becomes different from a desirable speed reduction ratio in a power transmission system from the motor to the drive wheels. The speed reduction ratios are easily set to desirable values, respectively, in a case where a speed reduction mechanism for the engine and a speed reduction mechanism for the motor are independently provided. However, the number of gear shift mechanisms increases, making it difficult to reduce the size of the drive device. In the device described in JP 9-226392 A, the second motor is coupled to the output element of the power split device, the three parallel gear type speed reduction mechanisms are arranged on the output side (the downstream side in the transmission direction of torque) of the second motor, and the speed reduction mechanisms are shared by the engine and the second motor. For this reason, it is possible to decrease the number of needed speed reduction mechanisms. However, in order to reduce the size of the second motor, in a case where the speed reduction ratio for the second motor is made larger, the speed reduction ratio for the engine becomes large. In particular, in the device described in JP 9-226392 A, since the carrier of the planetary gear mechanism constituting the power split device serves as an input element, the sun gear of the planetary gear mechanism serves as a reaction element, and the ring gear of the planetary gear mechanism serves as an output element, the gear ratio of the power split device at an operation point (mechanical point) in a state where the first motor is stopped to stop the rotation of the sun gear does not become sufficiently small (the speed increase ratio does not becomes sufficiently large), and as a result, an engine rotation speed may become high, causing a disadvantage in terms of improvement of fuel efficiency, and deterioration of NV characteristics, or the like may occur.

While JP 10-246173 A or JP 3-117752 A suggests a gear shift mechanism using a planetary gear mechanism, the devices described in JP 10-246173 A and JP 3-117752 A cannot be readily applied to a drive device for a hybrid vehicle.

The disclosure provides a drive device that is to achieve reduction in size of a drive device for a hybrid vehicle, and in particular, has an advantage in achieving reduction in size by reducing the number of needed speed reduction mechanisms (speed reduction units) provided in addition to a power split device.

An aspect of the disclosure relates to a drive device for a hybrid vehicle. The drive device includes an engine, a first motor, a power split device, a second motor, a first speed reduction unit, a second speed reduction unit, and a differential gear as a final drive gear. The first motor is configured to generate electric power. The power split device is configured to split drive power output from the engine into drive power to be transmitted to the first motor side and drive power to be transmitted to a drive wheel side. The power split device is a planetary gear mechanism. The planetary gear mechanism includes rotating elements that include a sun gear, a ring gear disposed so as to be concentric with the sun gear, and a carrier. The carrier retains pinion gears that mesh with the sun gear and the ring gear. The sun gear is an output element that outputs torque. The second motor is coupled to the sun gear. The second motor is configured to increase or decrease torque output from the power split device and to be transmitted to the differential gear. The first speed reduction unit is coupled to a sun gear. The second speed reduction unit is provided between the first speed reduction unit and the differential gear. The differential gear is configured to transmit torque to the drive wheel.

In the drive device according to the aspect of the disclosure, the power split device may be a single-pinion planetary gear mechanism including the pinion gears that mesh with the sun gear and the ring gear, and is retained by the carrier. The carrier may be an input element coupled to the engine. The ring gear may be a reaction element coupled to the first motor.

In the drive device according to the aspect of the disclosure, the power split device may be a double-pinion planetary gear mechanism including, as rotating elements, a sun gear, a ring gear disposed so as to be concentric with the sun gear, and a carrier retaining first pinion gears and second pinion gears. The first pinion gears may mesh with the sun gear. The second pinion gears may mesh with the first pinion gears and the ring gear. The ring gear may be an input element coupled to the engine. The carrier may be a reaction element coupled to the first motor.

In the drive device according to the aspect of the disclosure, the first speed reduction unit may be a winding power transmission mechanism including a drive-side rotor, an annular power transmission member, and a driven-side rotor. The drive-side rotor may be configured to rotate along with the output element. The power transmission member may be wound on the drive-side rotor and the driven-side rotor. The driven-side rotor may have a winding diameter greater than a winding diameter of the drive-side rotor.

In the drive device according to the aspect of the disclosure, the drive-side rotor may be a drive-side chain sprocket. The power transmission member may be a chain. The driven-side rotor may be a driven-side chain sprocket.

In the drive device according to the aspect of the disclosure, the drive-side chain sprocket and the driven-side chain sprocket may be rotatably supported by a needle bearing.

In the drive device according to the aspect of the disclosure, the differential gear may include a differential case. The second speed reduction unit may include an input member, a fixed member, and an output member. The second speed reduction unit may be configured to perform differential action by using the input member, the fixed member, and the output member. The second speed reduction unit may be a differential rotation mechanism in which the output member rotates in the same direction as the input member and at a speed lower than the input member in a state where rotation of the fixed member is stopped. The driven-side rotor may be coupled to the input member. The fixed member may be non-rotatably fixed. The differential case may be coupled to the output member.

In the drive device according to the aspect of the disclosure, the second speed reduction unit may be disposed to be offset with respect to the first speed reduction unit in a direction of a rotation center axis of the first speed reduction unit. The differential gear may be disposed to be offset from the second speed reduction unit in the direction of the rotation center axis of the first speed reduction unit, such that the differential gear is on an opposite side of the second speed reduction unit from the first speed reduction unit.

In the drive device according to the aspect of the disclosure, the first motor, the power split device, the drive-side rotor, and the second motor may be disposed in parallel on the same axis. The first motor and the power split device may be arranged in the order from the engine side.

In the drive device according to the aspect of the disclosure, the first speed reduction unit may be a first parallel gear speed reduction mechanism including an output gear and a counter driven gear. The output gear may be configured to rotate integrally with the output element. The counter driven gear may mesh with the output gear and may have a diameter greater than a diameter of the output gear. The second speed reduction unit may be a second parallel gear speed reduction mechanism including a counter drive gear and a differential ring gear. The counter drive gear may rotate integrally with the counter driven gear and may have a diameter smaller than a diameter of the counter driven gear. The differential ring gear may mesh with the counter drive gear and may have a diameter greater than a diameter of the counter drive gear. The differential ring gear may be provided in the differential gear.

According to the aspect of the disclosure, torque output from the engine is split into torque to be transmitted to the drive wheel side and torque to be transmitted to the first motor side by the power split device, and torque to be transmitted to the drive wheel side is transmitted from the differential gear to the drive wheel by way of the first speed reduction unit and the second speed reduction unit. That is, torque that is transmitted from the engine to the drive wheel is increased according to gear ratios or speed reduction ratios of the power split device and each speed reduction unit. Torque output from the second motor is transmitted from the differential gear to the drive wheel by way of the first speed reduction unit and the second speed reduction unit from the output element. That is, torque of the second motor is increased according to the speed reduction ratio of each speed reduction unit. Accordingly, in the aspect of the disclosure, substantial speed reduction mechanisms that act to amplify torque are three in total including the power split device and the speed reduction units, and for this reason, it is possible to reduce the size of the configuration of the drive device as a whole by reducing the number of mechanisms needed for torque amplification compared to the related art, and to achieve reduction in costs. In addition, in the aspect of the disclosure, since a rotation speed of the sun gear as an output element in the power split device can be made higher than an input rotation speed, even if the speed reduction ratio of the each speed reduction unit is made large, it is possible to suppress increase of particularly a speed reduction ratio between the engine and the drive wheel. Accordingly, it is possible to reduce the size of the second motor by making the speed reduction ratio of each speed reduction unit large, and in addition, it is possible to restrain or suppress increase of an engine rotation speed or deterioration of fuel efficiency or NV characteristics with the increase of the engine rotation speed. It is also possible to improve a degree of freedom for disposing the second motor by reducing the size of the second motor.

According to the aspect of the disclosure, in addition, the winding power transmission mechanism or the chain power transmission mechanism is employed for the first speed reduction unit, whereby it is possible to reduce the size of the configuration of the drive device as a whole.

In this case, the needle bearing is used as a bearing for bearing the sprocket, whereby it is possible to reduce the diameter or the size of a bearing structure for the sprocket, and consequently, it is possible to reduce the size of the configuration of the drive device as a whole.

According to the aspect of the disclosure, the second speed reduction unit is a differential mechanism and the first speed reduction unit is the winding power transmission mechanism. Therefore, the rotation directions of the first speed reduction unit and the second speed reduction unit are not reversed. For this reason, a member for returning the rotation direction, such as an idler, is not particularly limited. As a result, it is possible to achieve reduction in size and simplification by reducing the number of constituent members of each speed reduction unit, and consequently, it is possible to reduce the size of the configuration of the drive device as a whole.

Then, according to the aspect of the disclosure, the second speed reduction unit or the differential gear is disposed to be offset with respect to the first speed reduction unit in the direction of the rotation center axis, whereby it is possible to equalize the lengths or the like of right and left drive shafts by disposing the differential gear near a central portion in a width direction of the vehicle. Alternatively, since the differential gear is positioned at one side of the vehicle in the vehicle width direction, the differential gear is easily coupled to the drive shafts.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
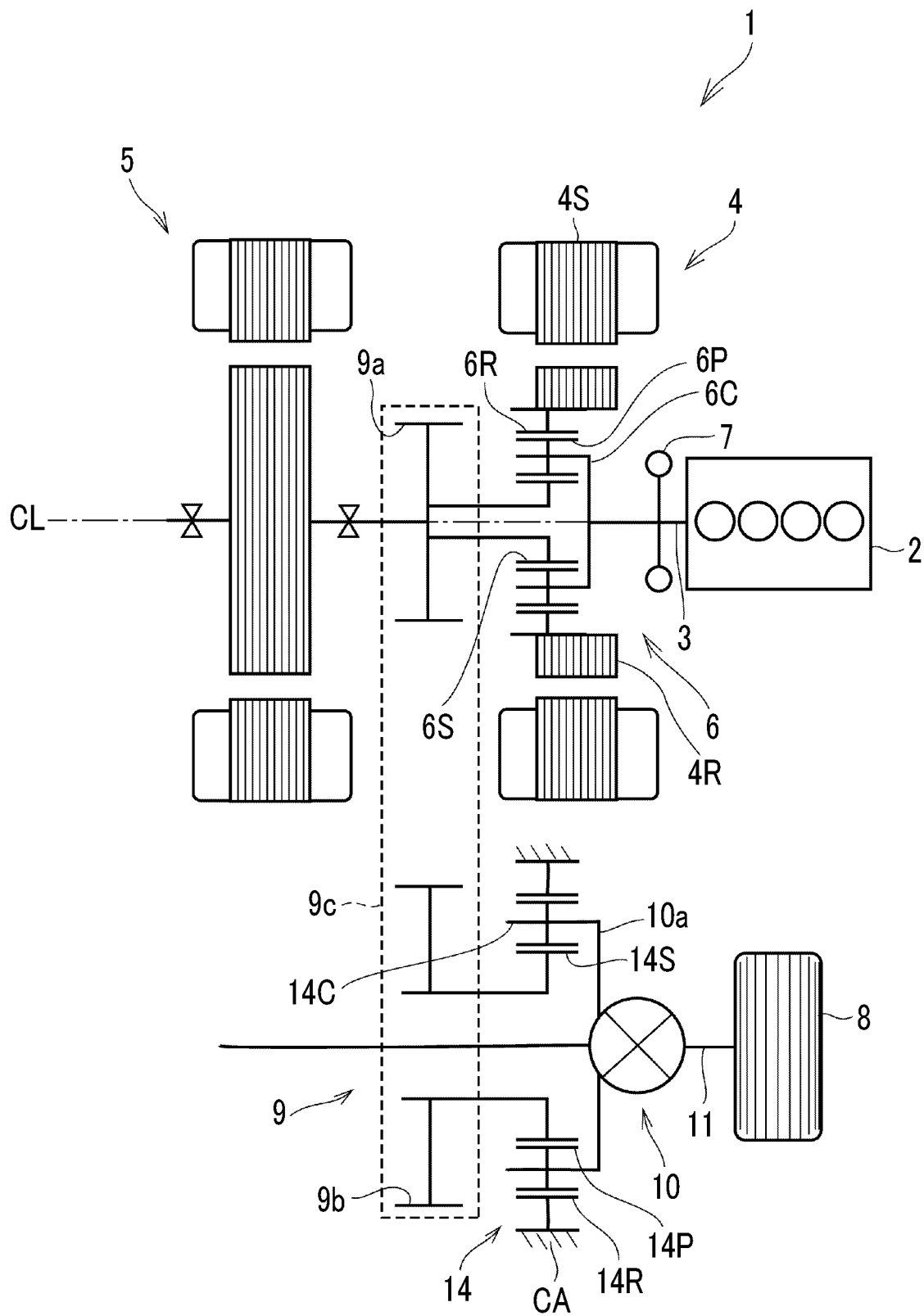
FIG. 1 is a schematic view showing a drive device according to an example of the disclosure.

A drive device for a hybrid vehicle according to an embodiment of the disclosure can be constituted as a transaxle having a differential gear as a final drive gear, and an example thereof is schematically shown in FIG. 1. A drive device 1 is a horizontal storage type in which an output shaft 3 (or a rotation center axis CL) of an engine (ENG) 2 is disposed to be in parallel with a vehicle width direction, and is mounted in a front engine-front drive FF vehicle or a rear engine-rear drive RR vehicle. The drive device 1 includes the engine 2 and two motors 4, 5 as a drive power source. The engine 2 is an internal combustion engine, such as a gasoline engine or a diesel engine. Each of the motors 4, 5 is a so-called motor generator configured to generate electric power, and an example thereof is a permanent magnet type synchronous motor.

The first motor 4 primarily functions as a power generator at the time of non-stationary traveling, and the second motor 5 functions as a motor supplied with electric power from an electric power storage device (not shown) or the first motor 4 and generates drive power for traveling of the vehicle. A power split device 6 is disposed on the same axis as the engine 2 on an output side of the engine 2. The power split device 6 is configured to split power output from the engine 2 to the first motor 4 The output shaft 3 of the engine 2 is coupled to the power split device 6 through a damper mechanism 7.

The power split device 6 is a differential mechanism that splits input power to the first motor 4 side and an output side toward a drive wheel 8 using differential action of three rotating elements, and can be suitably constituted of a planetary gear mechanism. In the example shown in FIG. 1, the power split device 6 is a single-pinion planetary gear mechanism. The single-pinion planetary gear mechanism includes, rotating elements, a sun gear 6S, a ring gear 6R as an internal gear disposed so as to be concentric with the sun gear 6S, and a carrier 6C that retains pinion gears 6P meshing with the sun gear 6S and the ring gear 6R rotatably and revolvably, and the carrier 6C is coupled to the output shaft 3 of the engine 2 and serves as an input element.

The first motor 4 has a stator 4S and a rotor 4R, the rotor 4R is formed in a cylindrical shape, and the planetary gear mechanism that constitutes the power split device 6 is disposed on an inner peripheral side of the rotor 4R. That is, the first motor 4 is disposed so as to be concentric with the power split device 6 and on the rotation center axis CL of the engine 2. Then, the rotor 4R of the first motor 4 and the ring gear 6R of the power split device 6 are coupled to rotate integrally. Accordingly, the ring gear 6R serves as a reaction element. The sun gear 6S that is the remaining one rotating element among the three rotating elements is an output element. As described above, the power split device 6 and the first motor 4 are disposed to overlap each other on the inner and outer peripheries, whereby reduction in a shaft length (overall length) of the drive device 1 is achieved.

Here, the power split device 6 will be further described. There is a plurality of ways of assigning to assign the three rotating elements constituting the power split device 6 to an input element, a reaction element, and a fixed element. In the configuration shown in FIG. 1, among the above-described ways of assigning, the rotating elements are assigned to an input element, a reaction element, and an output element, respectively, such that an increase ratio of an output rotation speed to an input rotation speed becomes maximum. Here, the increase ratio of the output rotation speed to the input rotation speed is the ratio of the output rotation speed to the input rotation speed in a case where both of the input element and the output element are rotated in the same direction (specifically, a rotation direction of the engine 2) in a state in which rotation of the reaction element is stopped.

Figure 2:
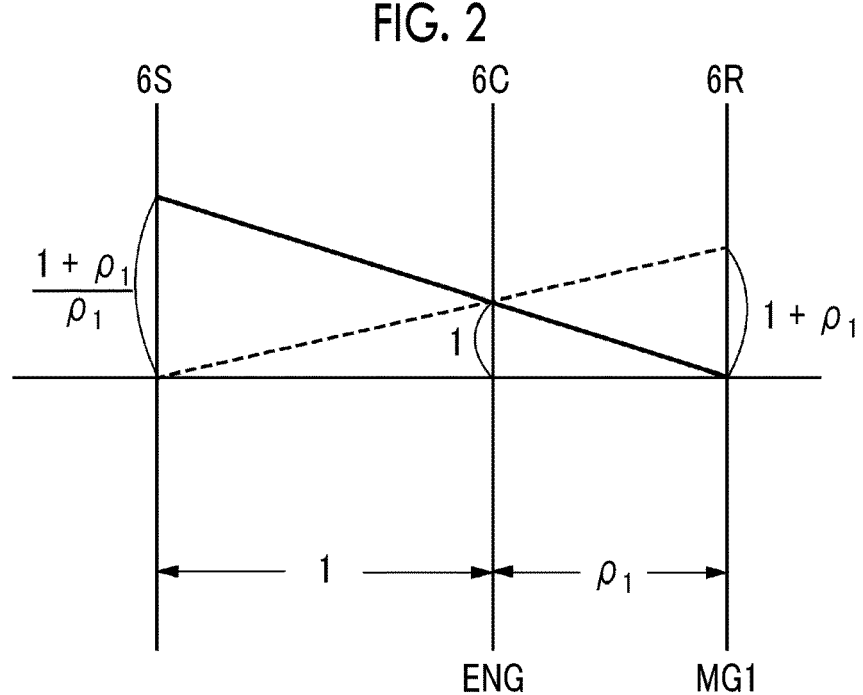
FIG. 2 is a collinear diagram for a planetary gear mechanism of the drive device.

FIG. 2 is a collinear diagram for the planetary gear mechanism shown in FIG. 1, and shows a state in which the ring gear 6R is a reaction element such that the ring gear 6R is fixed along with the first motor 4 (MG1), and both of the sun gear 6S as an input element and the engine (ENG) 2 are rotated. The sun gear 6S rotates in a forward direction as the rotation direction of the engine 2, whereby the sun gear 6S as an output element rotates in the forward direction. In this case, in a case where a gear ratio (the ratio of the number of teeth of the sun gear 6S to the number of teeth of the ring gear 6R) of the planetary gear mechanism is denoted as "$\rho_1$", a rotation speed of the sun gear 6S as an output element becomes a rotation speed "$(1+\rho_1)/\rho_1$" times a rotation speed of the carrier 6C as an input element, the increase ratio becomes "$(1+\rho_1)/\rho_1$", and the gear ratio becomes "$\rho_1/(1+\rho_1)$". For comparison, an example of a case where the sun gear 6S is fixed as a reaction element and the ring gear 6R serves as an output element is shown by a broken line in FIG. 2. In this case, since the increase ratio becomes "$1+\rho_1$" and the gear ratio becomes "$1/(1+\rho_1)$", the increase ratio becomes smaller than that in the case of the configuration shown in FIG. 1. That is, in the configuration shown in FIG. 1, the carrier 6C, the ring gear 6R, and the sun gear 6S are assigned to an input element, a reaction element, and an output element, respectively, such that the increase ratio in a case where the reaction element is fixed and both of the input element and the output element are rotated in the same direction becomes maximum.

The first speed reduction unit 9 is on the opposite side of the power split device 6 and the first motor 4 from the engine 2. In the embodiment, the first speed reduction unit can be a winding power transmission mechanism having a chain or a belt as a power transmission member, and in the example shown in FIG. 1, the first speed reduction unit 9 is a chain unit. Specifically, a drive-side chain sprocket 9a as a drive-side rotor is disposed on the same axis as the sun gear 6S to rotate integrally with the sun gear 6S, a driven-side chain sprocket 9b as a driven-side rotor is disposed in parallel with the drive-side chain sprocket 9a on a rotation center axis (on an axis of a drive shaft 11) of a differential gear 10 as a final drive gear, and an annular chain 9c as a power transmission member is wound on the sprockets 9a, 9b. Though not particularly limited, it is desirable that the chain 9c is a silent chain. A winding diameter of the driven-side chain sprocket 9b is greater than a winding diameter of the drive-side chain sprocket 9a.

Figure 3:
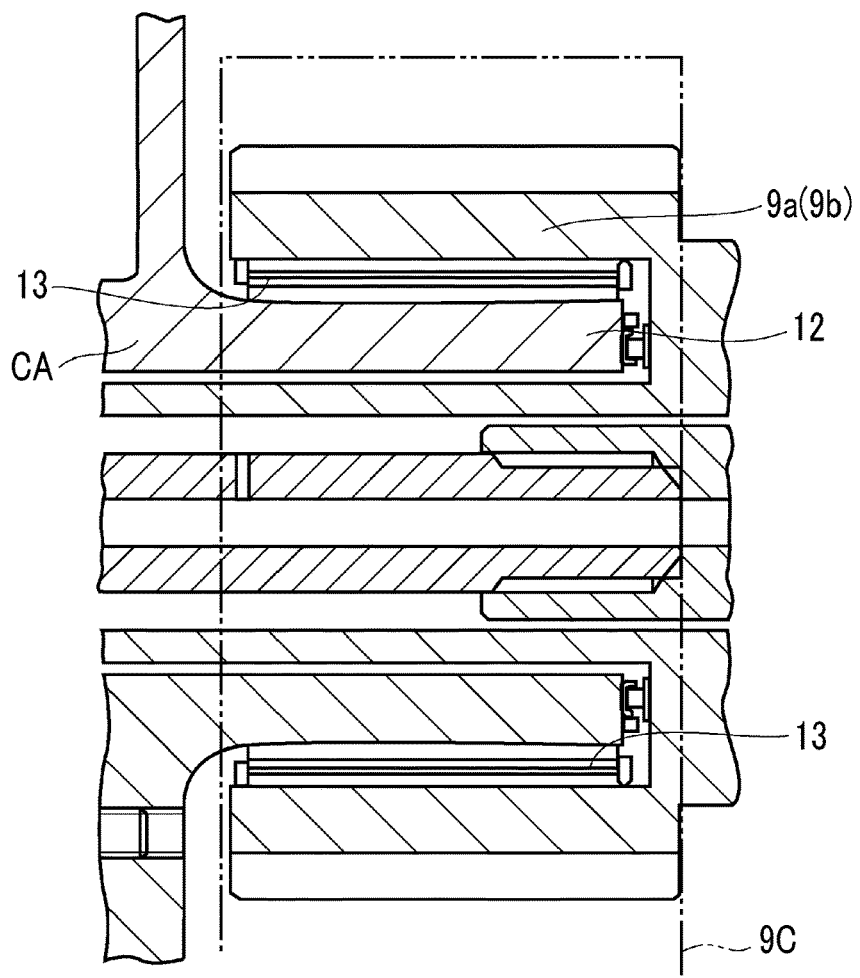
FIG. 3 is a partial sectional view showing an example of a bearing of a sprocket.

Each of the sprockets 9a, 9b is supported by a predetermined boss part 12 provided inside a transaxle case CA. FIG. 3 shows an example of the boss part 12, a needle bearing 13 is fitted to an outer peripheral side of the boss part 12, and the sprockets 9a, 9b are rotatably retained by the needle bearing 13. The needle bearing 13 can support load over the overall length of the needle, and can also support large load since the needle bearing 13 is in line contact with an inner race and an outer race. In addition, since the outer diameter of the needle may be small, the sprockets 9a, 9b are reduced in diameter, whereby it is possible to achieve reduction in size or diameter of the first speed reduction unit 9 or the drive device 1.

On the rotation center axis CL of the engine 2, the second motor 5 (MG2) is disposed on the opposite side of the first motor 4, the power split device 6, the drive-side chain sprocket 9a as a drive-side rotor, and the like from the engine 2. The second motor 5 includes a stator 5S and a rotor 5R, and the rotor 5R is coupled to the sun gear 6S as an output element of the power split device 6 to rotate integrally. Accordingly, in the configuration shown in FIG. 1, torque output from the second motor 5 is added to torque that is output from the power split device 6.

The second speed reduction unit 14 is provided downstream of the first speed reduction unit 9 in the transmission direction of torque toward the drive wheel 8. The second speed reduction unit 14 is a speed reduction mechanism that further amplifies torque transmitted from the first speed reduction unit 9 and transmits amplified torque to the differential gear 10, and in the example shown in FIG. 1, is a single-pinion planetary gear mechanism that is an example of a differential rotation mechanism. The planetary gear mechanism is disposed adjacent to and on the same axis as the driven-side chain sprocket 9b, and a sun gear 14S is coupled to the driven-side chain sprocket 9b to rotate integrally. A ring gear 14R disposed so as to be concentric with the sun gear 14S is provided, and the ring gear 14R is attached and fixed to a predetermined location of the transaxle case CA. Pinion gears 14P that mesh with the sun gear 14S and the ring gear 14R is rotatably and revolvably retained by a carrier 14C. Accordingly, the sun gear 14S is an example of an input member, the ring gear 14R is an example of a fixed member, and the carrier 14C is an example of an output member.

The differential gear 10 is disposed adjacent to and on the same axis as the second speed reduction unit 14. The differential gear 10 is disposed on an outer peripheral side of the first motor 4, and a position of the differential gear 10 is a position close to a central portion in the width direction of the vehicle. The differential gear 10 has the same configuration as a differential gear that is used as a final drive gear for a vehicle in the related art and has a differential case 10a that houses a side gear (not shown) or the like coupled to the drive shaft 11 of the drive wheel 8, and the differential case 10a is coupled to the carrier 14C of the second speed reduction unit 14. Accordingly, the sun gear 14S of the planetary gear mechanism constituting the second speed reduction unit 14 serves as an input element, the ring gear 14R serves as a reaction (fixed) element, the carrier 14C serves as an output element, and the second speed reduction unit 14 is configured such that a rotation speed of the carrier 14C becomes lower than a rotation speed of the sun gear 14S, and both of the sun gear 14S and the carrier 14C rotate in the same direction (forward direction).

In the drive device 1 having the configuration shown in FIG. 1, torque of the engine 2 or torque of the second motor 5 is transmitted to the drive wheel 8 as follows. Torque output from the engine 2 is transmitted to the carrier 6C of the power split device 6. The power split device 6 operates, for example, as shown in the collinear diagram of FIG. 2, and gear shift action occurs. Torque increased or decreased by the occurred gear shift action is transmitted to the first speed reduction unit 9, and torque is amplified by transmitted speed reduction action. Torque increased by the first speed reduction unit 9 is transmitted to the second speed reduction unit 14, and torque increased by the second speed reduction unit 14 is transmitted to the drive wheel 8 through the differential gear 10. Accordingly, three speed reduction units (gear shift units) of the power split device 6, the first speed reduction unit 9, and the second speed reduction unit 14 that perform gear shift action or speed reduction action are disposed between the engine 2 and the drive wheel 8, and torque output from the engine 2 is increased or decreased according to a total gear ratio multiplied by the gear ratio (speed reduction ratio) of each gear shift unit or each speed reduction unit and is transmitted to the drive wheel 8. In contrast, torque output from the second motor 5 is transmitted in the order of the first speed reduction unit 9 and the second speed reduction unit 14 and is transmitted from the differential gear 10 to the drive wheel 8. That is, output torque of the second motor 5 receives speed reduction action of each of the speed reduction units 9, 14 and is increased according to the speed reduction ratio of each of the speed reduction units 9, 14, and the total speed reduction ratio becomes a value multiplied by the speed reduction ratio of each of the speed reduction units 9, 14.

A total speed reduction ratio from the engine 2 to the drive wheel 8 affects acceleration performance or fuel efficiency of the hybrid vehicle, NV characteristics, or the like, and is determined in advance for design based on the type of the vehicle, characteristics to be applied to the vehicle, or the like. In a case where the power split device 6 is a planetary gear mechanism as described above, a gear ratio that can be set by the planetary gear mechanism is limited in terms of the structure, strength, or the like of the planetary gear mechanism, and in contrast, the degree of freedom for design of the downstream-side speed reduction unit is higher than that of the planetary gear mechanism. The total speed reduction ratio with the setting request or the limiting factor described above is schematically shown in FIG. 4.

Figure 4:
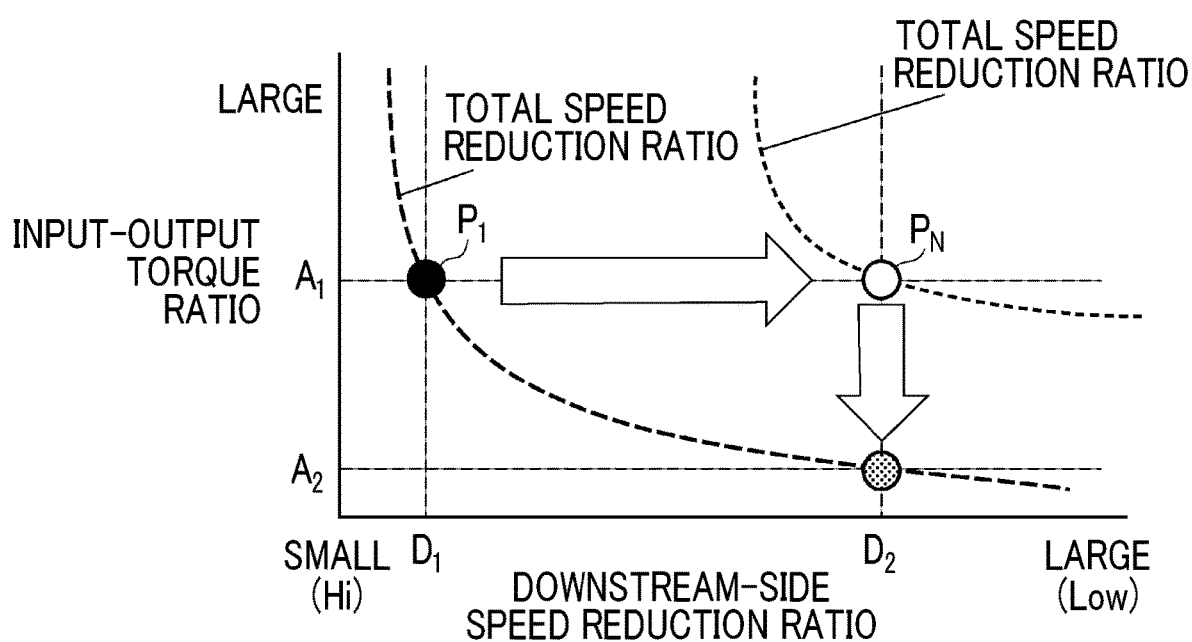
FIG. 4 is a linear diagram illustrating a total speed reduction ratio.

In FIG. 4, the vertical axis indicates the ratio (an input-output torque ratio or a gear ratio) of torque of an input element to torque of an output element in a power split device constituted of a planetary gear mechanism, and shows that the ratio has a smaller value on a side closer to the origin (a lower side in FIG. 4). The horizontal axis indicates a speed reduction ratio (downstream-side speed reduction ratio) of a speed reduction unit downstream of the power split device, and shows that the speed reduction ratio has a smaller value (a Hi-side value) on a side closer to the origin. A curve indicated by a thick broken line of FIG. 4 indicates a total speed reduction ratio that is desirable in design, and for example, a total speed reduction ratio of the device described in JP 9-226392 A described above is indicated by a $P_1$ point of FIG. 4. The input-output torque ratio is indicated by an $A_1$ point, and this is a value in a case where the carrier of the single-pinion planetary gear mechanism serves as an input element, the ring gear serves as an output element, and the sun gear serves as a reaction element. The downstream-side speed reduction ratio is indicated by a $D_1$ point. The downstream-side speed reduction ratio indicated by the symbol $D_1$ is a speed reduction ratio between the second motor and the drive wheel.

In a case where the downstream-side speed reduction ratio is made large as indicated by symbol $D_2$ (is set to a Low-side value), the total speed reduction ratio becomes, for example, a value indicated by symbol $P_N$, and is deviated greatly from a desirable value in design. In this state, even though the downstream-side speed reduction ratio is changed, the total speed reduction ratio changes as indicated by a thin broken line in FIG. 4, and does not become a desirable value in design. In the total speed reduction ratio described above, for example, since the speed reduction ratio between the engine and the drive wheel becomes large, the same state as a case where the vehicle is traveling while setting a low gear stage is brought, drive power becomes excessively large or the engine rotation speed becomes high and fuel efficiency is deteriorated. In contrast, in the embodiment described above, the power split device 6 is configured such that the increase ratio of the rotation speed of the output element (sun gear 6S) to the input rotation speed in the power split device 6 becomes maximum, the input-output torque ratio shown in FIG. 4 becomes small, and as a result, even though the downstream-side speed reduction ratio is increased to a value indicated by the symbol $D_2$, the total speed reduction ratio becomes a desirable value in design indicated by the thick broken line or a value close to the desirable value. Accordingly, in the embodiment, it is possible to achieve reduction in size of the second motor 5 or reduction in size and weight of the drive device 1 without deteriorating power performance of the drive device 1, fuel efficiency of the vehicle mounted with the drive device 1, or the like.

In the configuration shown in FIG. 1, since the power split device 6 and the first motor 4 are disposed on the engine 2 side from the first speed reduction unit 9, coupling of the engine 2 and the power split device 6 or coupling of the power split device 6 and the first motor 4 is easily made. Since the second speed reduction unit 14 is disposed to be offset with respect to the first speed reduction unit 9 in a direction along the rotation center axis CL, the differential gear 10 is disposed to be offset from the second speed reduction unit 14 such that the differential gear 10 is on an opposite side of the second speed reduction unit 14 from the first speed reduction unit 9, and in addition, the offset direction of the second speed reduction unit 14 and the differential gear 10 is directed toward the engine 2, the position of the differential gear 10 becomes a position near the center in the width direction of the vehicle. For this reason, the distances between the differential gear 10 and the right and left drive wheels 8 are equalized, and it is possible to cancel or suppress the difference in structure, such as a length or a weight, between the right and left drive shafts 11. In a case where a direction of deviation in an axial direction is directed toward one of the right and left drive wheels 8, connection of the drive shafts 11 is simplified, and a space for the differential gear 10 is easily secured.

Other examples of the embodiment will be described. In the embodiment, disposing of the motors 4, 5, the power split device 6, and the speed reduction units 9, 14 is not limited to the example shown in FIG. 1, and can be appropriately changed as needed. FIGS. 5 to 8 schematically show examples of such a change. In the examples shown in the drawings, since the positions of disposing the motors 4, 5, the power split device 6, and the like in the drive device 1 having the configuration shown in FIG. 1 are changed, in FIGS. 5 to 8, the same members as the members shown in FIG. 1 are represented by the same reference numerals as the reference numerals in FIG. 1, and detailed description of the members will not be repeated.

Figure 5:
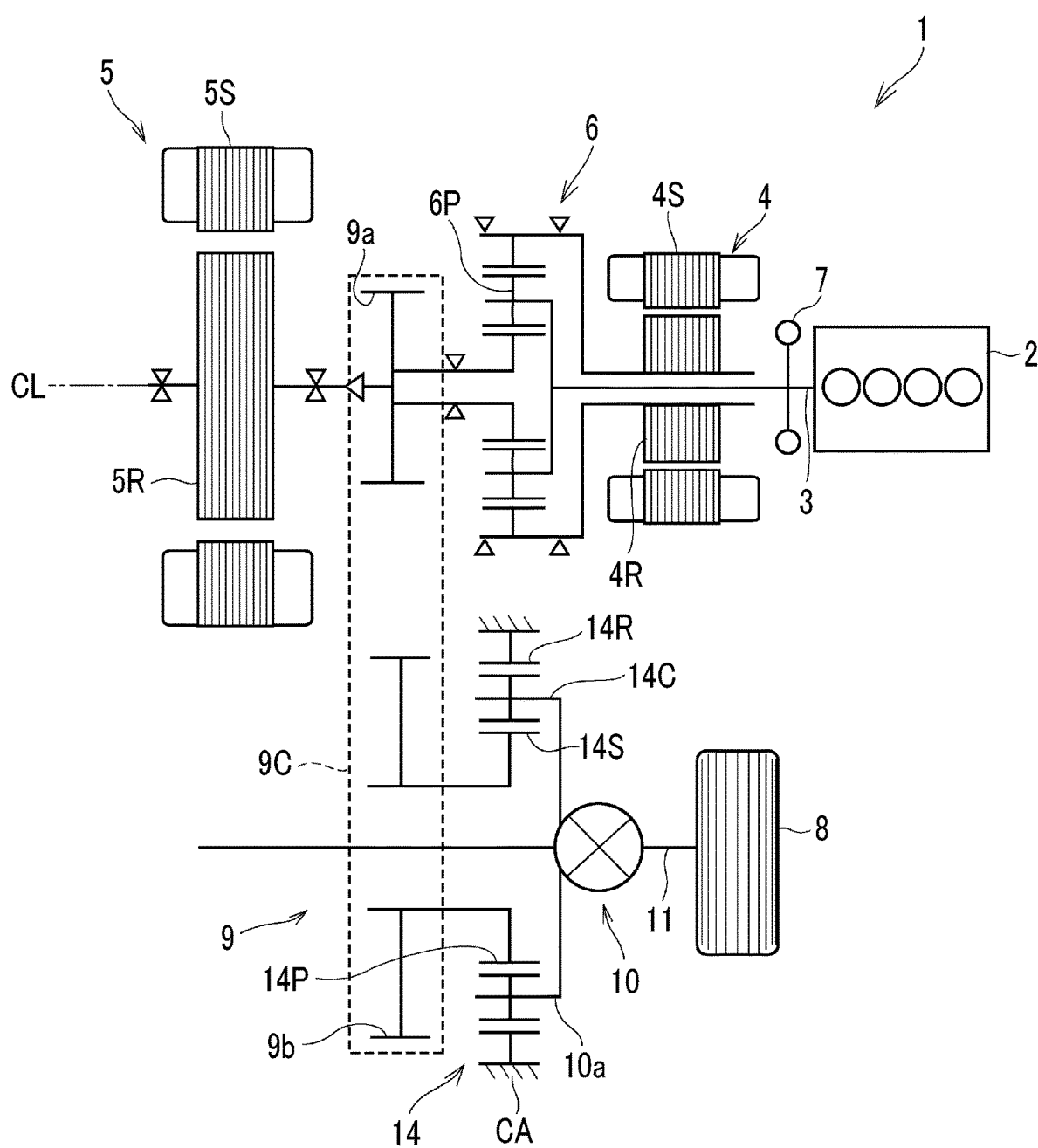
FIG. 5 is a schematic view showing another example of the disclosure where a chain is employed for a first speed reduction unit.

The example shown in FIG. 5 is an example where, in place of the configuration in which the first motor 4 is disposed so as to be concentric with the power split device 6, the first motor 4 and the power split device 6 are disposed in parallel in the axial direction, and the first motor 4 is disposed between the power split device 6 and the engine 2. In the configuration shown in FIG. 5, while the number of members that are disposed in parallel on the rotation center axis CL of the engine 2 increases compared to the configuration shown in FIG. 1, since the number of members that are concentrically disposed centering on the rotation center axis CL decreases, it is possible to make the outer diameter of the drive device 1 as a whole small.

Figure 6:
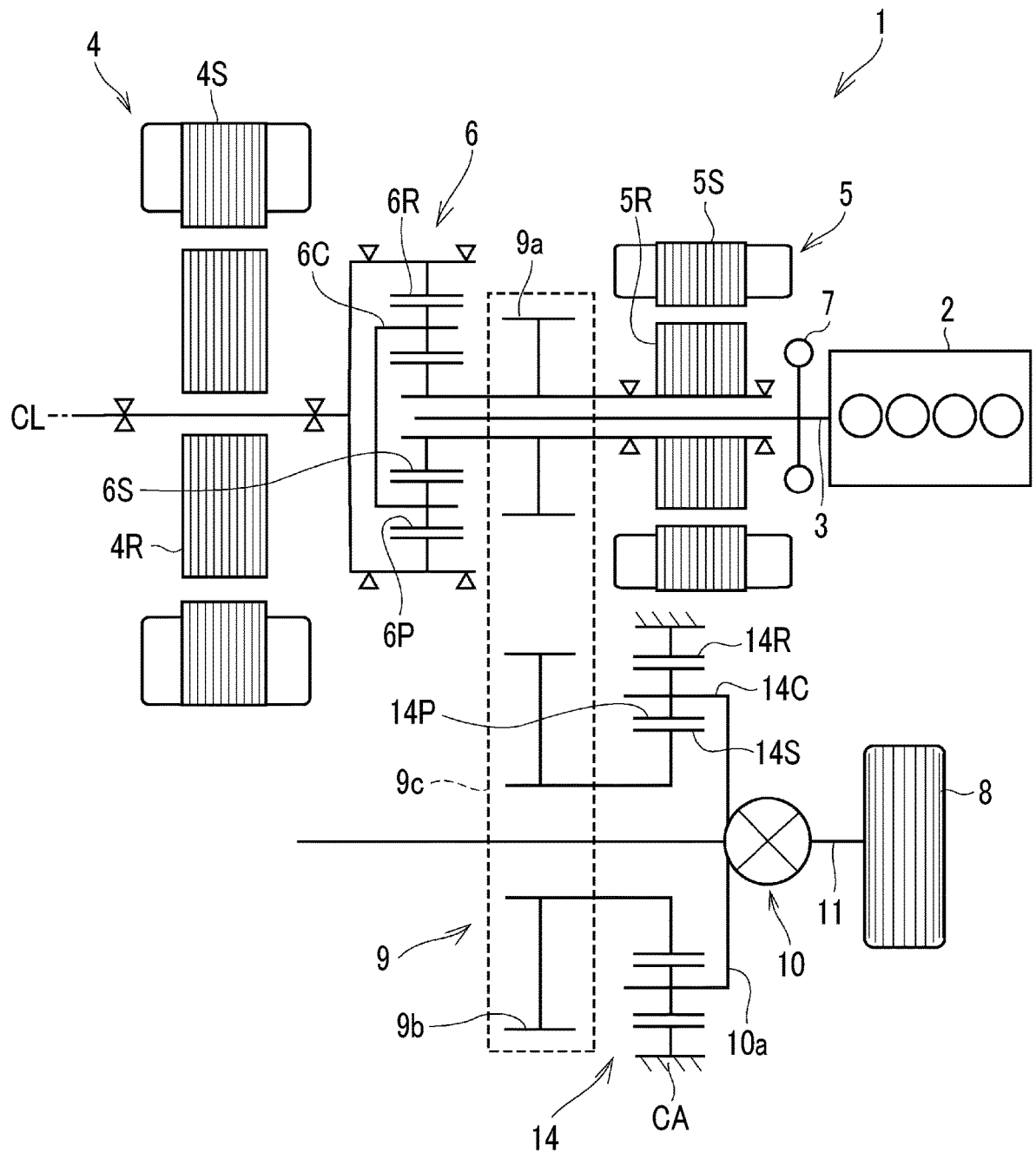
FIG. 6 is a schematic view showing still another example of the disclosure where a chain is employed for a first speed reduction unit.

The example shown in FIG. 6 is an example where the positions of the first motor 4, the power split device 6, and the second motor 5 are replaced. That is, the second motor 5, the first speed reduction unit 9, the power split device 6, and the first motor 4 are arranged in the order from the engine 2 side. In the configuration, when the speed reduction ratio between the second motor 5 and the drive wheel 8 is made large to reduce the size of the second motor 5, it is possible to dispose the differential gear 10 or the second speed reduction unit 14 on the outer peripheral side of the second motor 5. When the first speed reduction unit 9 is positioned near the engine 2 in a direction along the rotation center axis CL, the differential gear 10 is disposed near the center in the width direction of the vehicle, and it is possible to achieve equalization of the structure, such as the length, between the right and left drive shafts 11.

Figure 7:
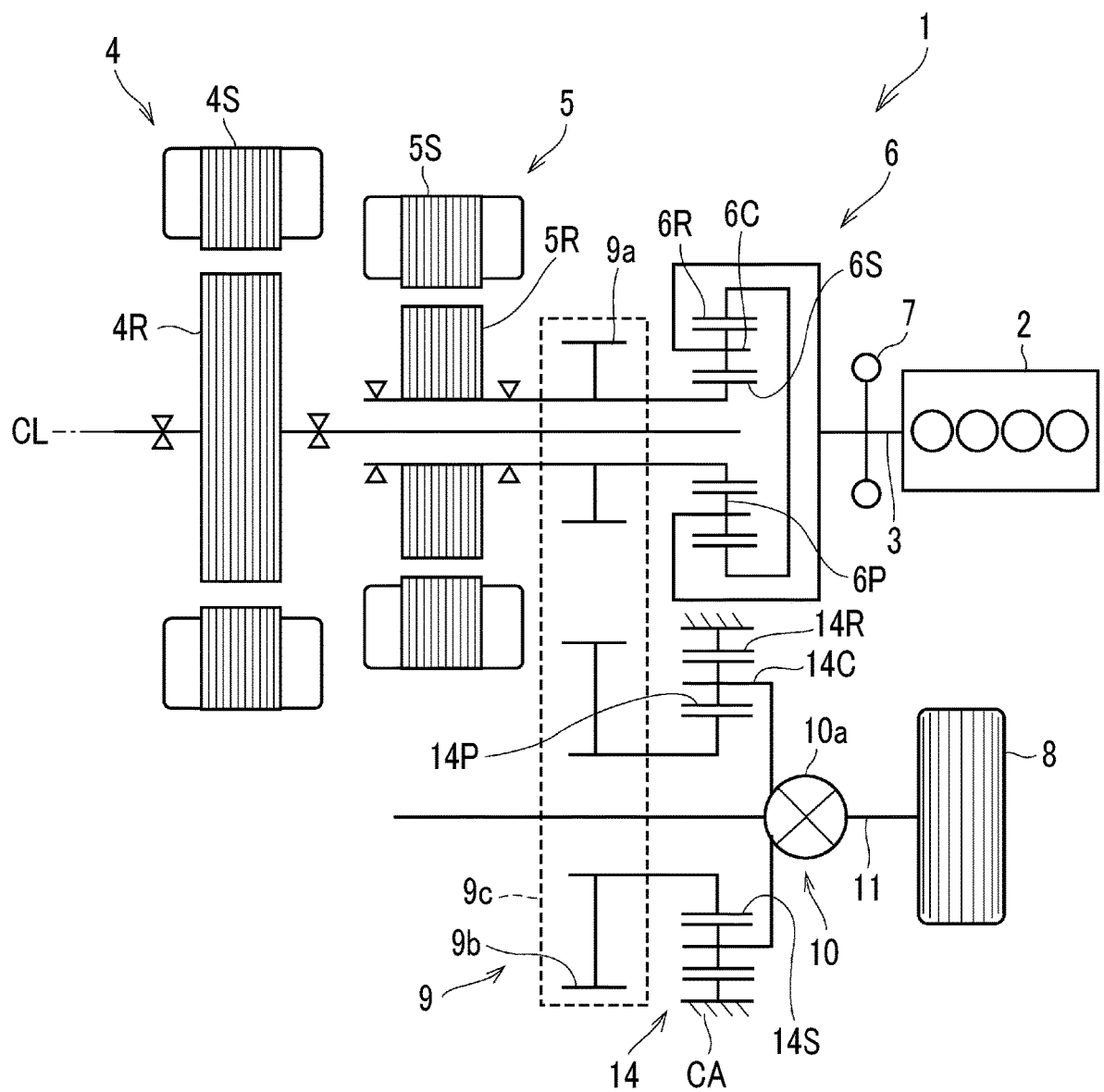
FIG. 7 is a schematic view showing still another example of the disclosure where a chain is employed for a first speed reduction unit.

The example shown in FIG. 7 is an example where the power split device 6, the first speed reduction unit 9, the second motor 5, and the first motor 4 are arranged in the order from the engine 2 side. That is, both of the two motors 4, 5 are disposed on an opposite side from the engine 2. Accordingly, in the configuration shown in FIG. 7, it is possible to simplify a configuration for cooling the motors 4, 5, a configuration or a wiring structure of a terminal block (not shown), or the like.

Figure 8:
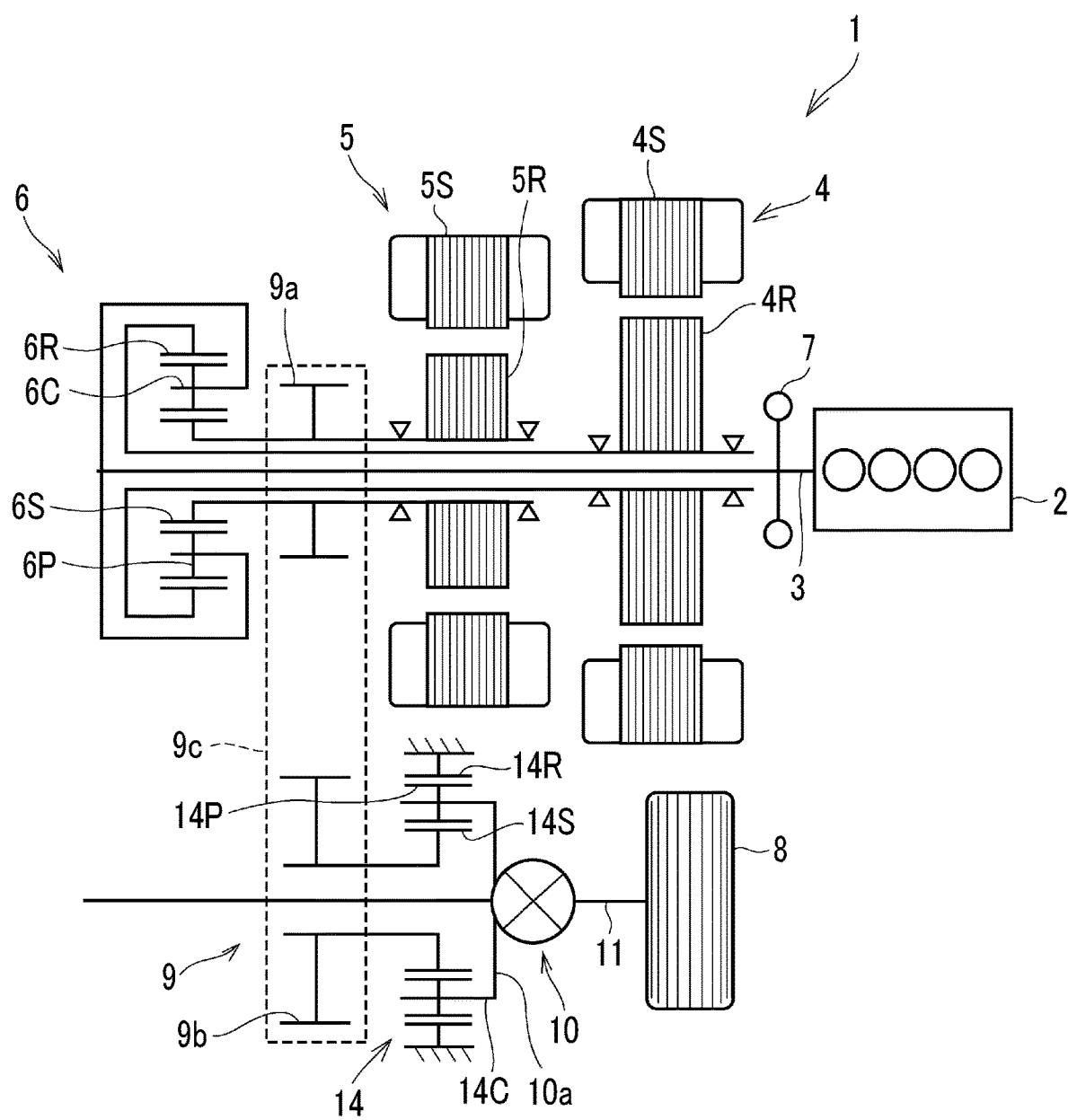
FIG. 8 is a schematic view showing still another example of the disclosure where a chain is employed for a first speed reduction unit.

The example shown in FIG. 8 is an example where the motors 4, 5 are disposed on the engine 2 side in contrast to the example shown in FIG. 7. That is, the first motor 4, the second motor 5, the first speed reduction unit 9, and the power split device 6 are arranged on the rotation center axis CL of the engine 2 in the order from the engine 2 side. Accordingly, in the configuration shown in FIG. 8, as in the example shown in FIG. 7 described above, it is possible to simplify a configuration for cooling the motors 4, 5, a configuration or a wiring structure of a terminal block, or the like.

Figure 9:
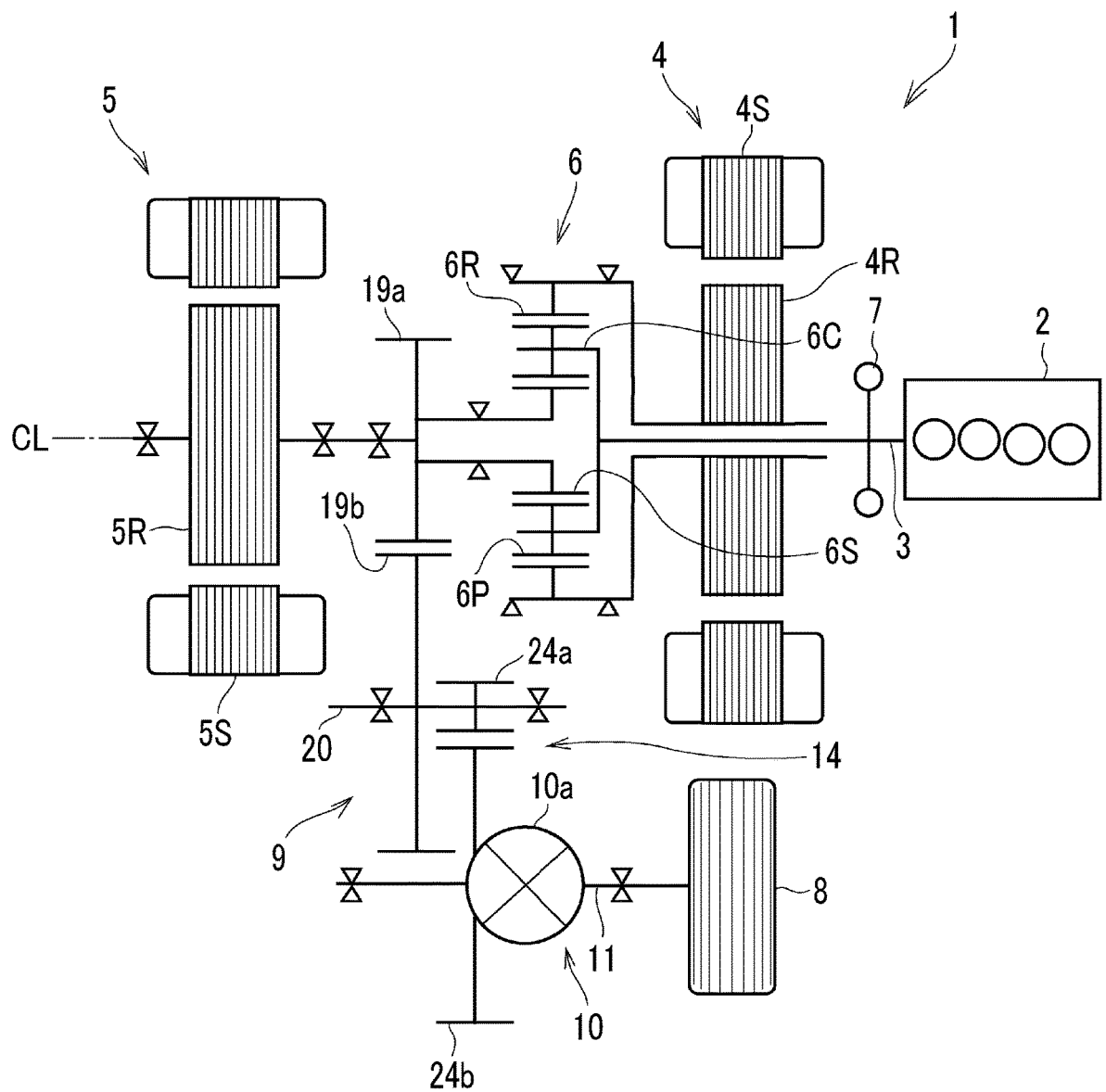
FIG. 9 is a schematic view showing an example of the disclosure where each speed reduction unit is a parallel gear speed reduction mechanism.

Each of the speed reduction units 9, 14 in the embodiment can be a parallel gear speed reduction mechanism having a pair of gears meshing with each other. An example of such a configuration is shown in FIG. 9. The example of FIG. 9 is an example where each of the speed reduction units 9, 14 in the example shown in FIG. 5 is substituted with a parallel gear speed reduction mechanism. Accordingly, portions having the same configuration as the configuration shown in FIG. 5 are represented by the same reference numerals as those in FIG. 5, and description thereof will not be repeated.

The first speed reduction unit 9 in the drive device 1 shown in FIG. 9 includes an output gear 19a, and a counter driven gear 19b that has a diameter greater than that of the output gear 19a and meshes with the output gear 19a. The output gear 19a is an example of an input-side member, is disposed between the power split device 6 and the second motor 5 on the rotation center axis CL of the engine 2, and is coupled to the sun gear 6S as an output element of the power split device 6 and the rotor 5R of the second motor 5. A counter shaft 20 is disposed in parallel with the rotation center axis CL of the engine 2, and the counter driven gear 19b as an example of an output-side member is retained by the counter shaft 20.

The differential gear 10 includes a differential ring gear 24b integrated with the differential case 10a, and is retained by that counter shaft 20 such that a counter drive gear 24a having a diameter smaller than that of the differential ring gear 24b and meshing with the differential ring gear 24b rotates integrally with the counter driven gear 19b. That is, the counter drive gear 24a and the differential ring gear 24b constitute the above-described second speed reduction unit 14 as a parallel gear speed reduction mechanism. In the example shown in FIG. 9, the second speed reduction unit 14 and the differential gear 10 are disposed on an outer peripheral side of the power split device 6.

In the configuration shown in FIG. 9, the first speed reduction unit 9 and the second speed reduction unit 14, each of which is a parallel gear speed reduction mechanism, are disposed in series between the second motor 5 and the drive wheel 8, and a speed reduction ratio multiplied by the speed reduction ratio of the parallel gear speed reduction mechanism becomes the speed reduction ratio of the downstream-side speed reduction unit described above. The power split device 6 and each of the speed reduction units 9, 14 as a parallel gear speed reduction mechanism that perform gear shift action are provided in series between the engine 2 and the drive wheel 8, and a value obtained by multiplying the above-described input-output torque ratio in the power split device 6 by the speed reduction ratio of each of the speed reduction units 9, 14 becomes a total speed reduction ratio. Accordingly, even in the configuration shown in FIG. 9, even though the downstream-side speed reduction ratio is made large in order to reduce the size of the second motor 5, the input-output torque ratio in the power split device 6 is small, whereby it is possible to set the total speed reduction ratio to a desirable value in design. In other words, it is possible to reduce the size of the second motor 5 or the drive device 1 itself while maintaining the performance of the drive device 1. Since the number of members that are disposed outside the motors 4, 5 in a radial direction to overlap the motors 4, 5 is reduced, it is advantageous for making the outer diameter of the drive device 1 as a whole small.

Figure 10:
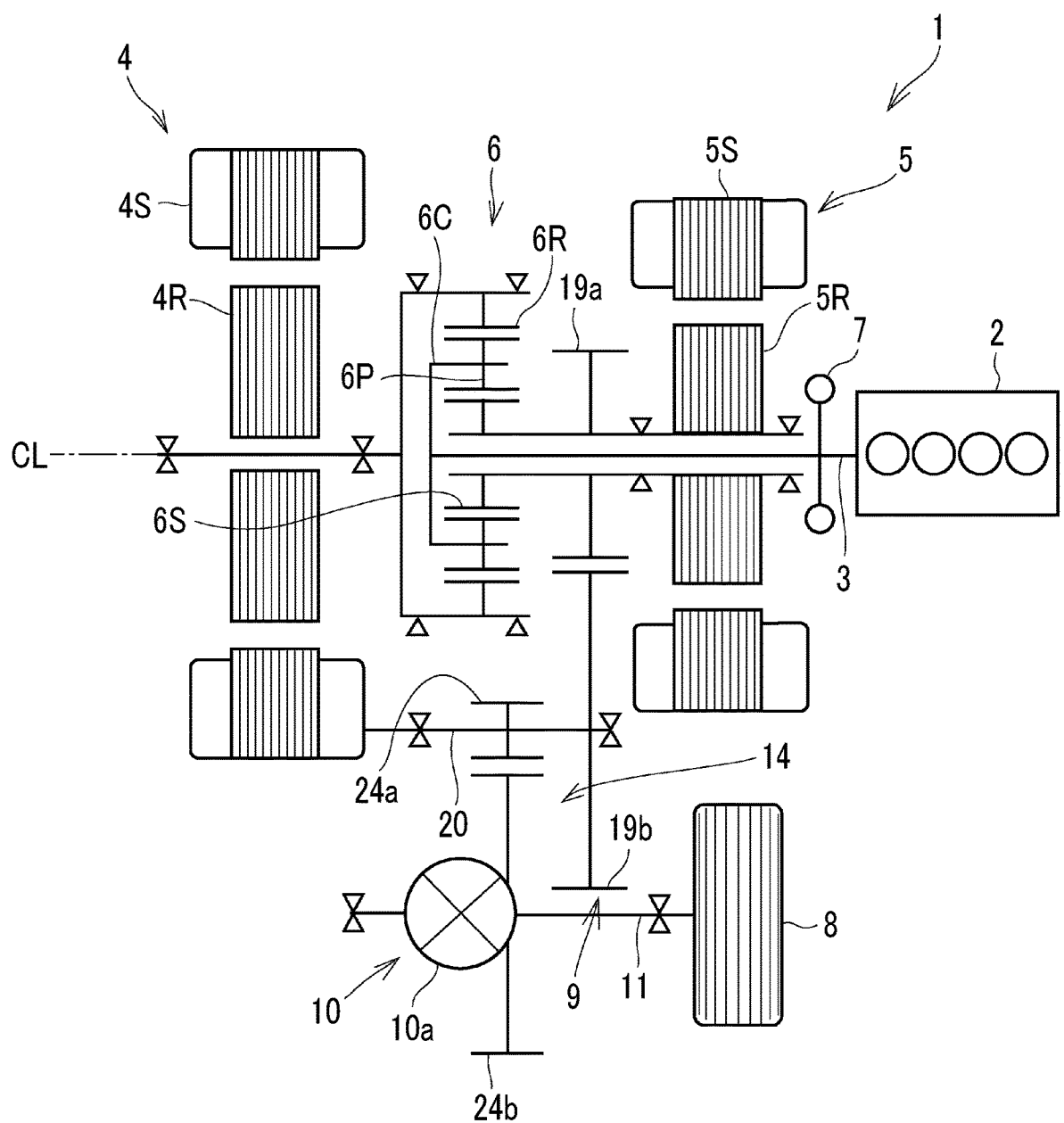
FIG. 10 is a schematic view showing another example of the disclosure where each speed reduction unit is a parallel gear speed reduction mechanism.

The example shown in FIG. 10 is an example where, in the configuration shown in FIG. 9 described above, the positions of the power split device 6 and the first speed reduction unit 9 are replaced on the rotation center axis CL, and the positions of the counter driven gear 19b and the counter drive gear 24a on the counter shaft 20 and the positions of the second speed reduction unit 14 and the differential gear 10 on the rotation center axis of the drive shaft 11 are inverted right and left. Even in the configuration shown in FIG. 10, the second speed reduction unit 14 and the differential gear 10 are disposed on the outer peripheral side of the power split device 6 to overlap in the radial direction. Accordingly, in a case where a configuration is made as shown in FIG. 10, it is possible to obtain the same functional effects as the functional effects according to the configuration shown in FIG. 9 described above.

Figure 11:
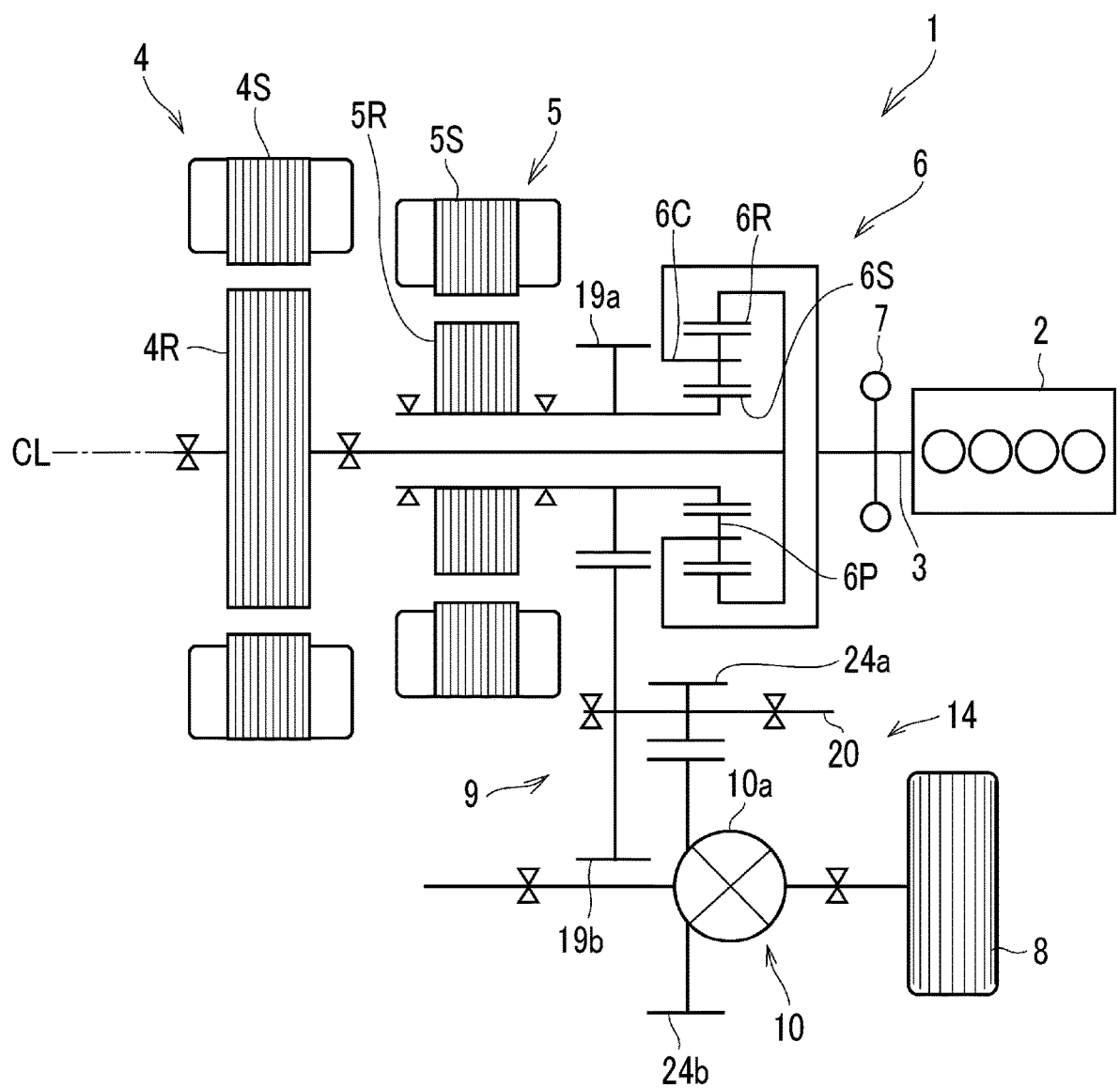
FIG. 11 is a schematic view showing still another example of the disclosure where each speed reduction unit is a parallel gear speed reduction mechanism.
Figure 12:
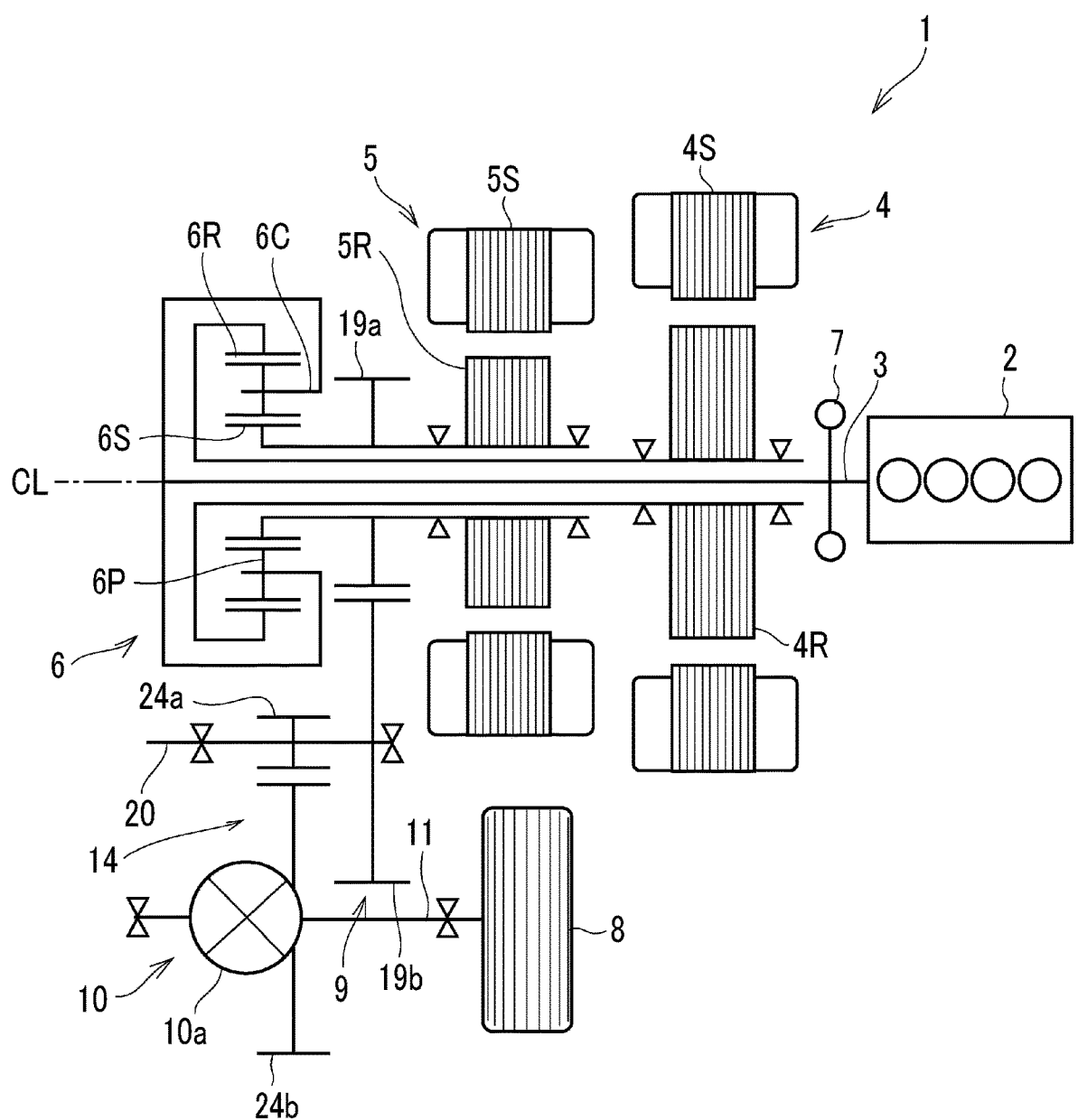
FIG. 12 is a schematic view showing still another example of the disclosure where each speed reduction unit is a parallel gear speed reduction mechanism.

Even in a case where each of the speed reduction units 9, 14 is a parallel gear speed reduction mechanism as described above, the motors 4, 5 can be collectively disposed on an opposite side from the engine 2 or can be disposed at positions near the engine 2. The example shown in FIG. 11 is an example where the motors 4, 5 are disposed on an opposite side of the power split device 6 and the first speed reduction unit 9 from the engine 2. FIG. 12 shows an example where the motors 4, 5 are disposed at positions near the engine 2, and the first speed reduction unit 9 and the power split device 6 are disposed on an opposite side of the motors 4, 5 from the engine 2. With the drive device 1 configured as shown in FIGS. 11 and 12, it is possible to obtain the same functional effects as those of the drive device 1 configured as shown in FIG. 7 or 8 described above.

Figure 13:
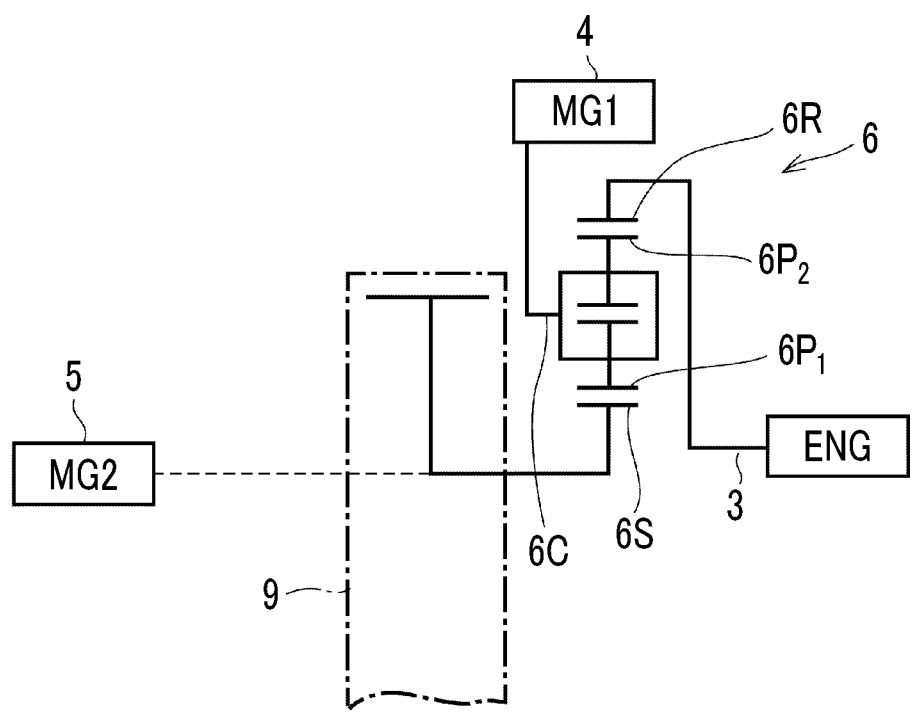
FIG. 13 is a partial schematic view showing an example of a power split device being a double-pinion planetary gear mechanism.

As an embodiment of the disclosure, an example where a power split device 6 is a double-pinion planetary gear mechanism is shown in FIG. 13. In the power split device 6 shown in the drawing, first pinion gears $6P_1$ that mesh with a sun gear 6S, and second pinion gears $6P_2$ that mesh with the first pinion gears $6P_1$ and a ring gear 6R are provided between the sun gear 6S and the ring gear 6R, and the pinion gears $6P_1$, $6P_2$ are rotatably and revolvably retained by a carrier 6C. The sun gear 6S is an output element and is coupled to the first speed reduction unit 9, and the second motor (MG2) 5 is coupled to the sun gear 6S to rotate integrally with the sun gear 6S. The ring gear 6R is an input element and is coupled to the output shaft 3 of the engine 2. Then, the carrier 6C is a reaction element and is coupled to the first motor (MG1) 4. Other configurations may be the same as those in any example described above, and thus, description thereof will not be repeated.

In the double-pinion planetary gear mechanism, in a case of a configuration in which the sun gear is fixed, and in a case of a configuration in which the carrier is fixed, the other two rotating elements serve as an input element or an output element, whereby the other two rotating elements rotate in the same direction. In the configuration shown in FIG. 13, since the carrier 6C serves as a reaction element and can be fixed, the gear ratio of the planetary gear mechanism is smaller than "0.5", whereby an increase ratio of the rotation speed of the output element to the rotation speed of the input element at a so-called mechanical point becomes maximum. Accordingly, as in each embodiment described above, it is possible to make the so-called downstream-side speed reduction ratio of the first and second speed reduction units 9, 14 large while maintaining the total speed reduction ratio to a desirable value in design, and accordingly, to reduce the size of the configuration of the second motor 5 or the drive device 1 as a whole. It is also possible to increase the degree of freedom for disposing the second motor 5. Even in the example shown in FIG. 13, it is possible to employ a parallel gear speed reduction mechanism having the above-described configuration as the speed reduction units 9, 14.

A reference example of a power split device is shown in FIGS. 14A to 24B. In the following description, solely a portion of the power split device 6 will be shown and described, and description of other portions will be omitted. FIGS. 14A to 14D show an example where a power split device 6 is a planetary gear mechanism that includes stepped pinion $6P_S$. The stepped pinion $6P_S$ is retained by a carrier 6C. The stepped pinion $6P_S$ includes small-diameter pinion gears $6P_3$ having a small pinch circle diameter and large-diameter pinion gears $6P_4$ having a pinch circle diameter greater than the small-diameter pinion gears $6P_3$ integrated in parallel on the same axis. The power split device 6 further includes a sun gear 6S, a first ring gear $6R_1$, and a second ring gear $6R_2$ as rotating elements. The sun gear 6S servers as an output element and is coupled to the first speed reduction unit 9, and the second motor 5 is coupled to the sun gear 6S. The first ring gear $6R_1$ serves as a reaction element and is coupled to the first motor 4. In addition, the second ring gear $6R_2$ serves as an input element and is coupled to the output shaft 3 of the engine 2.

Figure 14A:
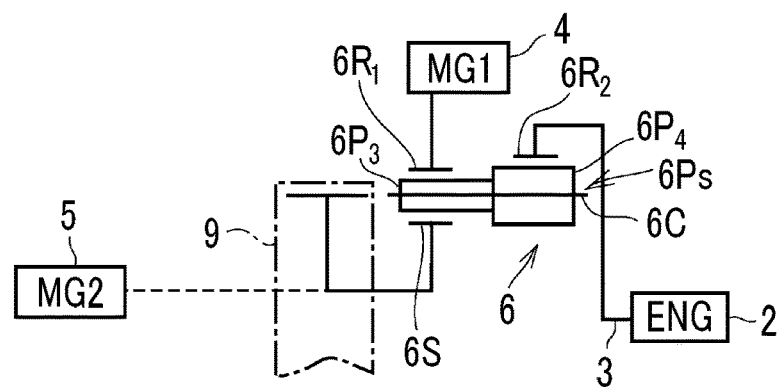
FIG. 14A is a partial schematic view showing a reference example of a power split device being a stepped pinion planetary gear mechanism.
Figure 14B:
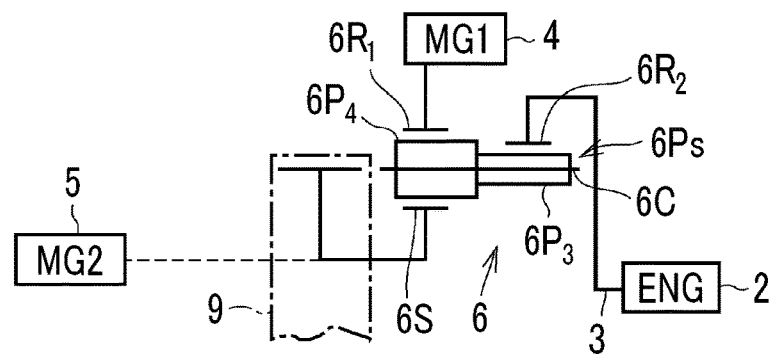
FIG. 14B is a partial schematic view showing another reference example of a power split device being the stepped pinion planetary gear mechanism.
Figure 14C:
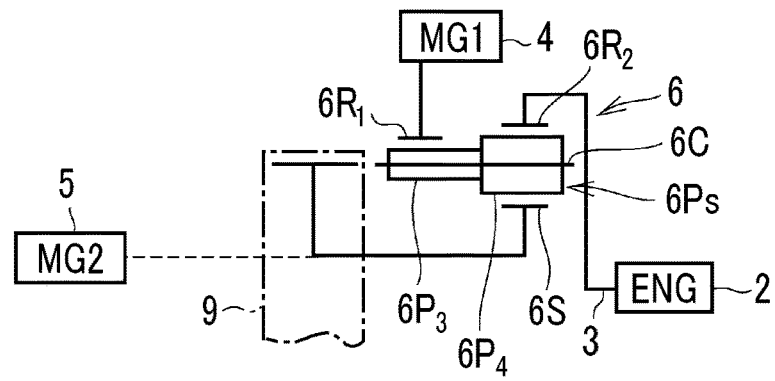
FIG. 14C is a partial schematic view showing another reference example of a power split device being the stepped pinion planetary gear mechanism.
Figure 14D:
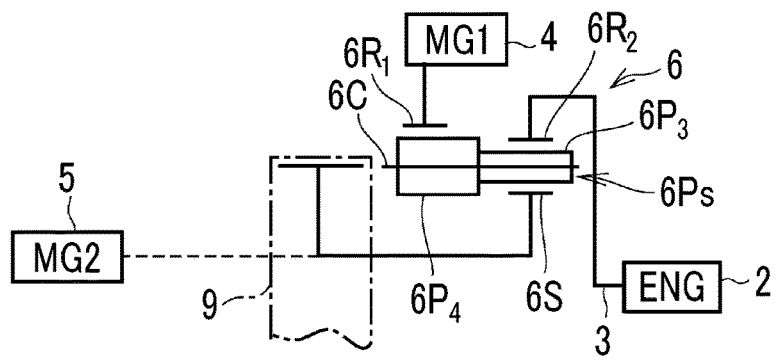
FIG. 14D is a partial schematic view showing another reference example of a power split device being the stepped pinion planetary gear mechanism.

In an example shown in FIG. 14A, the sun gear 6S and the first ring gear $6R_1$ mesh with the small-diameter pinion gears $6P_3$, and the second ring gear $6R_2$ meshes with the large-diameter pinion gears $6P_4$. An example shown in FIG. 14B is an example where the right and left directions of the stepped pinion $6P_S$ shown in FIG. 14A are inverted, the sun gear 6S and the first ring gear $6R_1$ mesh with the large-diameter pinion gears $6P_4$, and the second ring gear $6R_2$ meshes with the small-diameter pinion gears $6P_3$. An example shown in FIG. 14C is an example where, in the configuration shown in FIG. 14A, the sun gear 6S meshes with the large-diameter pinion gears $6P_4$ in place of the small-diameter pinion gears $6P_3$. An example shown in FIG. 14D is an example where, in the configuration shown in FIG. 14B, the sun gear 6S meshes with the small-diameter pinion gear $6P_3$ in place of the large-diameter pinion gears $6P_4$.

In the configurations shown in all of FIGS. 14A to 14D, since the increase ratio that is the ratio of the rotation speed of the sun gear 6S to the rotation speed of the second ring gear $6R_2$ in a case where the first ring gear $6R_1$ that serves as a reaction element is fixed is made large, as in each embodiment described above, it is possible to reduce the size of the configuration of the second motor 5 or the drive device 1 as a whole by making the so-called downstream-side speed reduction ratio large while maintaining the total speed reduction ratio to a desirable value in design. It is also possible to increase the degree of freedom for disposing the second motor 5.

Unlike the examples shown in FIGS. 14A to 14D described above, examples shown in FIGS. 15A to 15D are an example where a power split device 6 is a planetary gear mechanism that is a stepped pinion planetary gear mechanism and has a ring gear 6R, a first sun gear $6S_1$, and a second sun gear $6S_2$ as rotating elements. The ring gear 6R serves as an output element and is coupled to the first speed reduction unit 9. The first sun gear $6S_1$ serves as a reaction element and is coupled to the first motor 4. The second sun gear $6S_2$ serves as an input element and is coupled to the output shaft 3 of the engine 2.

Figure 15A:
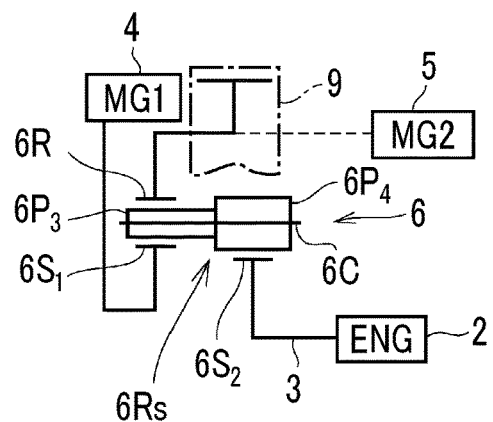
FIG. 15A is a partial schematic view showing another reference example of a power split device being a stepped pinion planetary gear mechanism.
Figure 15B:
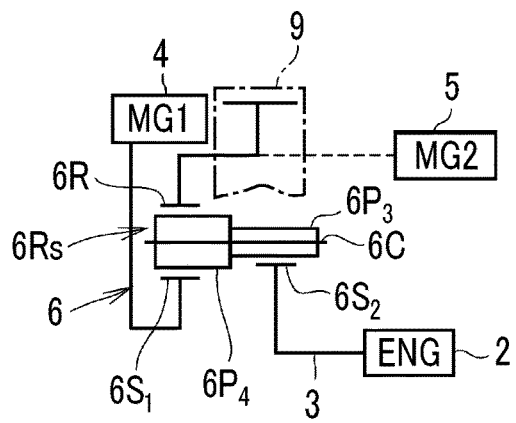
FIG. 15B is a partial schematic view showing another reference example of a power split device being the stepped pinion planetary gear mechanism.
Figure 15C:
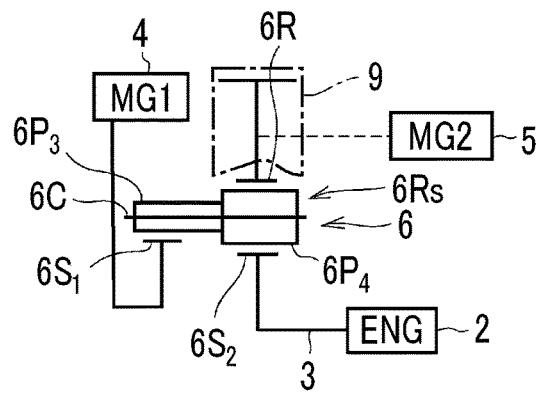
FIG. 15C is a partial schematic view showing another reference example of a power split device being the stepped pinion planetary gear mechanism.

In the example shown in FIG. 15A, the first sun gear $6S_1$ and the ring gear 6R mesh with the small-diameter pinion gears $6P_3$, and the second sun gear $6S_2$ meshes with the large-diameter pinion gears $6P_4$. The example shown in FIG. 15B is an example where the right and left directions of the stepped pinions $6P_S$ shown in FIG. 15A are inverted, the first sun gear $6S_1$ and the ring gear 6R mesh with the large-diameter pinion gears $6P_4$, and the second sun gear $6S_2$ meshes with the small-diameter pinion gears $6P_3$. The example shown in FIG. 15C is an example where, in the configuration shown in FIG. 15A, the ring gear 6R meshes with the large-diameter pinion gears $6P_4$ in place of the small-diameter pinion gears $6P_3$. The example shown in FIG. 15D is an example where, in the configuration shown in FIG. 15B, the ring gear 6R meshes with the small-diameter pinion gears $6P_3$ in place of the large-diameter pinion gears $6P_4$.

In the configurations of all of FIGS. 15A to 15D, since the increase ratio that is the ratio of the rotation speed of the ring gear 6R to the rotation speed of the second sun gear $6S_2$ in a case where the first sun gear $6S_1$ that serves as a reaction element is fixed is made large, as in each embodiment described above, it is possible to reduce the size of the configuration of the second motor 5 or the drive device 1 as a whole by making the so-called downstream-side speed reduction ratio large while maintaining the total speed reduction ratio to a desirable value in design. It is also possible to increase the degree of freedom for disposing the second motor 5.

Figure 15D:
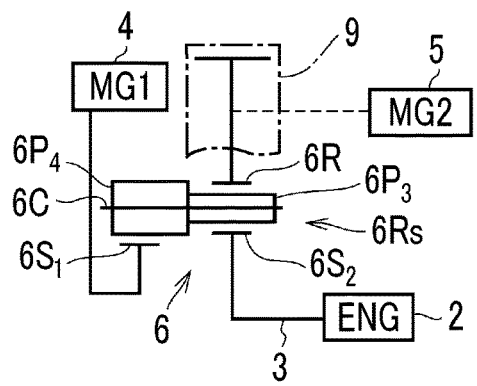
FIG. 15D is a partial schematic view showing another reference example of a power split device being the stepped pinion planetary gear mechanism.

Unlike the examples shown in FIGS. 14A and 15D described above, examples shown in FIGS. 16A to 16B are an example where a power split device 6 is a planetary gear mechanism that is a stepped pinion planetary gear mechanism and has a ring gear 6R, a sun gear 6S, and a carrier 6C as rotating elements. The sun gear 6S serves as an output element and is coupled to the first speed reduction unit 9. The ring gear 6R serves as a reaction element and is coupled to the first motor 4. In addition, the carrier 6C serves as an input element and is coupled to the output shaft 3 of the engine 2.

Figure 16A:
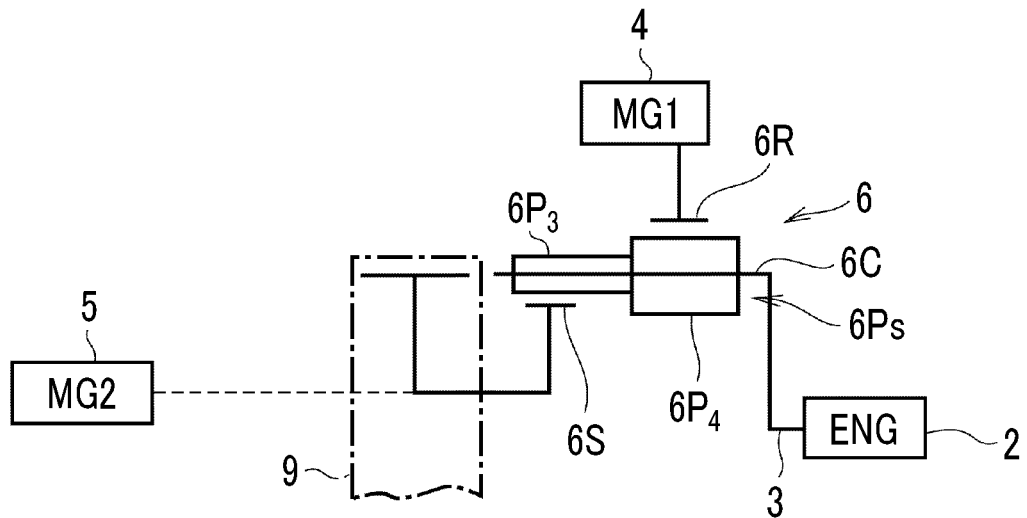
FIG. 16A is a partial schematic view showing another reference example of a power split device being a stepped pinion planetary gear mechanism.

In the example shown in FIG. 16A, the sun gear 6S meshes with the small-diameter pinion gears $6P_3$, and the ring gear 6R meshes with the large-diameter pinion gears $6P_4$. The example shown in FIG. 16B is an example where the right and left directions of the stepped pinion $6P_S$ shown in FIG. 16A are inverted, the sun gear 6S meshes with the large-diameter pinion gears $6P_4$, and the ring gear 6R meshes with the small-diameter pinion gears $6P_3$.

Figure 16B:
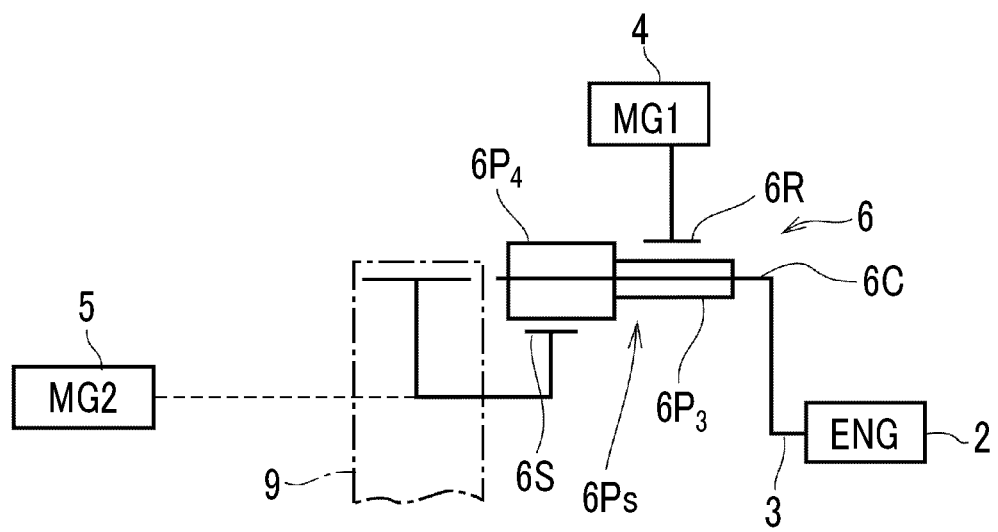
FIG. 16B is a partial schematic view showing another reference example of the power split device being the stepped pinion planetary gear mechanism.

In the configurations of both of FIGS. 16A and 16B, since the increase ratio that is the ratio of the rotation speed of the sun gear 6S to the rotation speed of the carrier 6C in a case where the ring gear 6R that serves as a reaction element is fixed is made large, as in each embodiment described above, it is possible to reduce the size of the configuration of the second motor 5 or the drive device 1 as a whole by making the so-called downstream-side speed reduction ratio large while maintaining the total speed reduction ratio to a desirable value in design. It is also possible to increase the degree of freedom for disposing the second motor 5.

Unlike the examples shown in FIGS. 16A and 16B described above, examples shown in FIGS. 17A and 17B are an example where a power split device 6 is a planetary gear mechanism that is a stepped pinion planetary gear mechanism, is provided with a second sun gear $6S_2$ in place of the ring gear 6R, and has a first sun gear $6S_1$, the second sun gear $6S_2$, and a carrier 6C as rotating elements. The first sun gear $6S_1$ serves as an output element and is coupled to the first speed reduction unit 9. The carrier 6C serves as a reaction element and is coupled to the first motor 4. In addition, the second sun gear $6S_2$ serves as an input element and is coupled to the output shaft 3 of the engine 2.

Figure 17A:
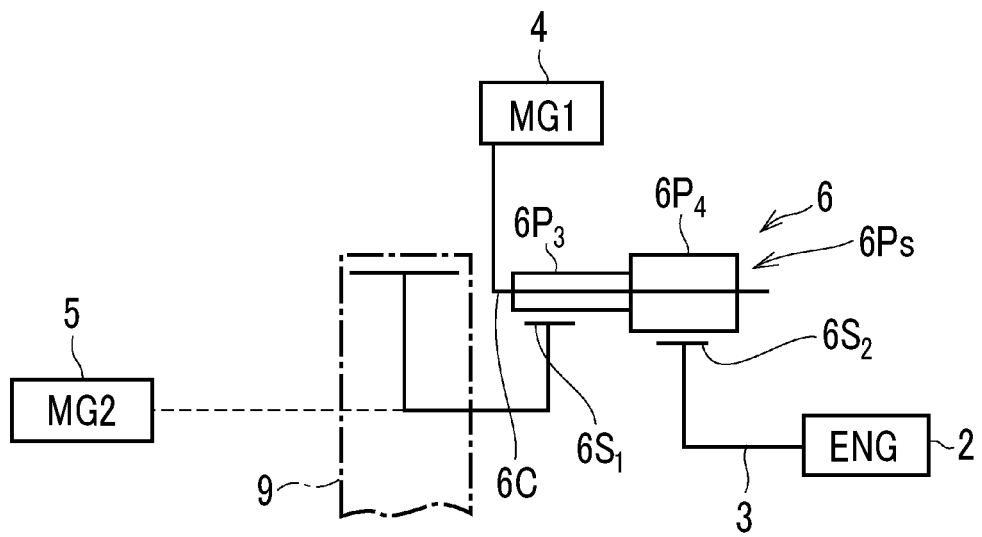
FIG. 17A is a partial schematic view showing another reference example of a power split device being a stepped pinion planetary gear mechanism.

In the example shown in FIG. 17A, the first sun gear $6S_1$ meshes with the small-diameter pinion gears $6P_3$, and the second sun gear $6S_2$ meshes with the large-diameter pinion gears $6P_4$. The example shown in FIG. 17B is an example where the right and left directions of the stepped pinion $6P_S$ shown in FIG. 17A are inverted, the first sun gear $6S_1$ meshes with the large-diameter pinion gears $6P_4$, and the second sun gear $6S_2$ meshes with the small-diameter pinion gears $6P_3$.

Figure 17B:
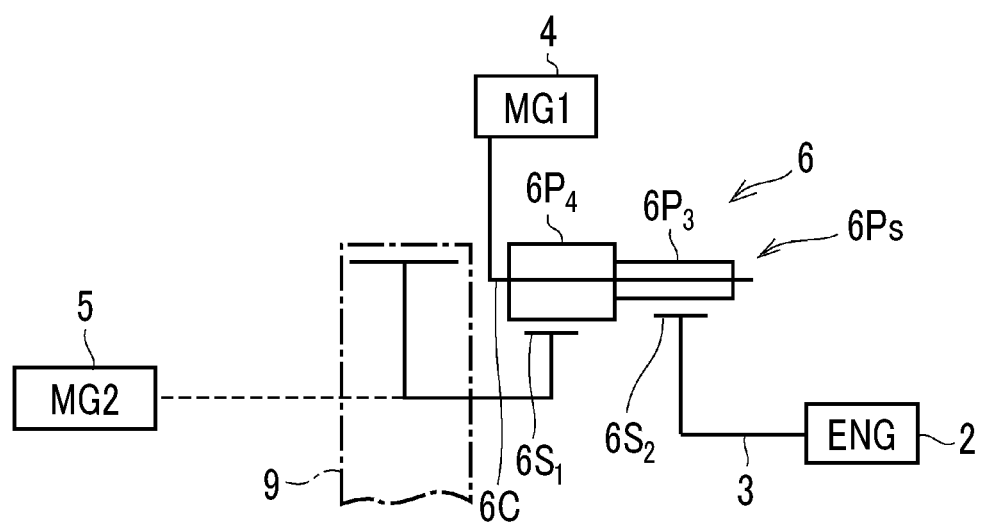
FIG. 17B is a partial schematic view showing another reference example of the power split device being the stepped pinion planetary gear mechanism.

In the configurations of both of FIGS. 17A and 17B, since the increase ratio that is the ratio of the rotation speed of the first sun gear $6S_1$ to the rotation speed of the second sun gear $6S_2$ in a case where the carrier 6C that serves as a reaction element is fixed is made large, as in each embodiment described above, it is possible to reduce the size of the configuration of the second motor 5 or the drive device 1 as a whole by making the so-called downstream-side speed reduction ratio large while maintaining the total speed reduction ratio to a desirable value in design. It is also possible to increase the degree of freedom for disposing the second motor 5.

In an embodiment of the disclosure, the power split device 6 can be a Ravigneaux planetary gear mechanism. The Ravigneaux planetary gear mechanism is a planetary gear mechanism in which long pinion gears having a long axial length and short pinion gears meshing with a part of the long pinion gears are rotatably and revolvably retained by a carrier. There are configurations in which the long pinion gears are disposed on an inner peripheral side from the short pinion gears, and in which, in contrast, the long pinion gears are disposed on an outer peripheral side from the short pinion gear.

Figure 18A:
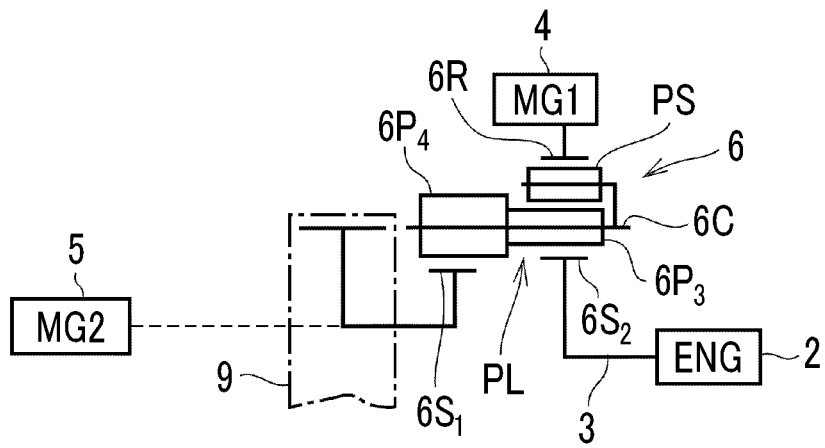
FIG. 18A is a schematic view showing a reference example of a power split device being a Ravigneaux planetary gear mechanism.
Figure 18B:
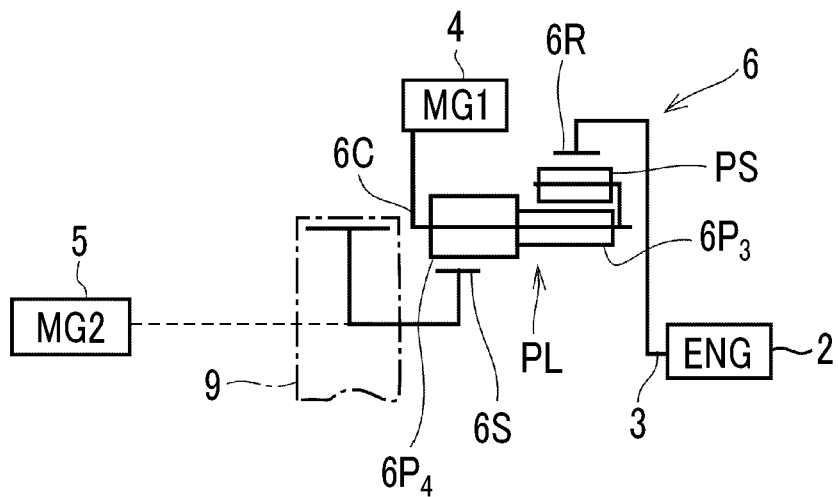
FIG. 18B is a schematic view showing another reference example of the power split device being the Ravigneaux planetary gear mechanism.
Figure 18C:
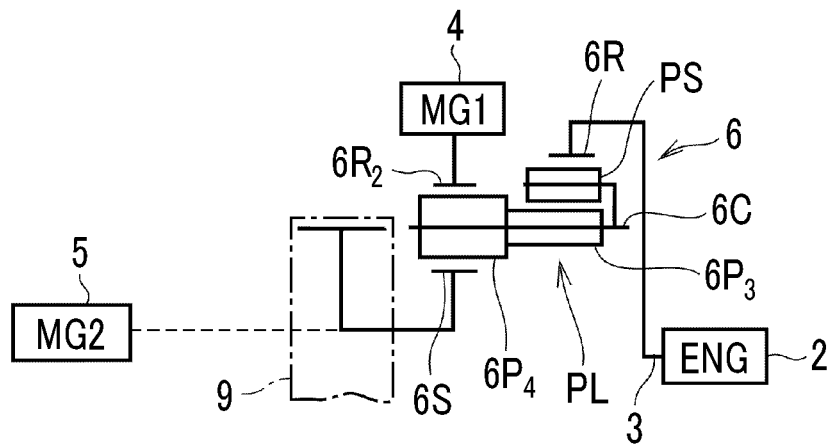
FIG. 18C is a schematic view showing another reference example of the power split device being the Ravigneaux planetary gear mechanism.

Examples shown in FIGS. 18A to 18C are an example using a Ravigneaux planetary gear mechanism in which long pinion gears PL is so-called stepped pinion gears having large-diameter pinion gears $6P_4$ and small-diameter pinion gears $6P_3$ in an integrated manner, and short pinion gears PS is disposed on an outer peripheral side of the stepped pinion gears to mesh with the stepped pinion gears and are retained by a carrier 6C. Then, in all of the examples shown in FIGS. 18A to 18C, a sun gear 6S that meshes with the large-diameter pinion gears $6P_4$ are provided, and the sun gear 6S is an output element and is coupled to the first speed reduction unit 9.

In the example shown in FIG. 18A, in addition to the sun gear 6S, a second sun gear $6S_2$ that meshes with the small-diameter pinion gears $6P_3$, and a ring gear 6R that meshes with the short pinion gears PS are further provided. The second sun gear $6S_2$ serves as an input element and is coupled to the output shaft 3 of the engine 2, and the ring gear 6R serves as a reaction element and is coupled to the first motor 4. In the example shown in FIG. 18B, the carrier 6C serves as a rotating element in place of the second sun gear $6S_2$ shown in FIG. 18A, and the carrier 6C serves as a reaction element and is coupled to the first motor 4. The ring gear 6R serves as an input element and is coupled to the output shaft 3 of the engine 2. In addition, in the example shown in FIG. 18C, a second ring gear $6R_2$ that meshes with the large-diameter pinion gears $6P_4$ are provided, and the second ring gear $6R_2$ serves as a reaction element in place of the carrier 6C shown in FIG. 18B and is coupled to the first motor 4.

Figure 19A:
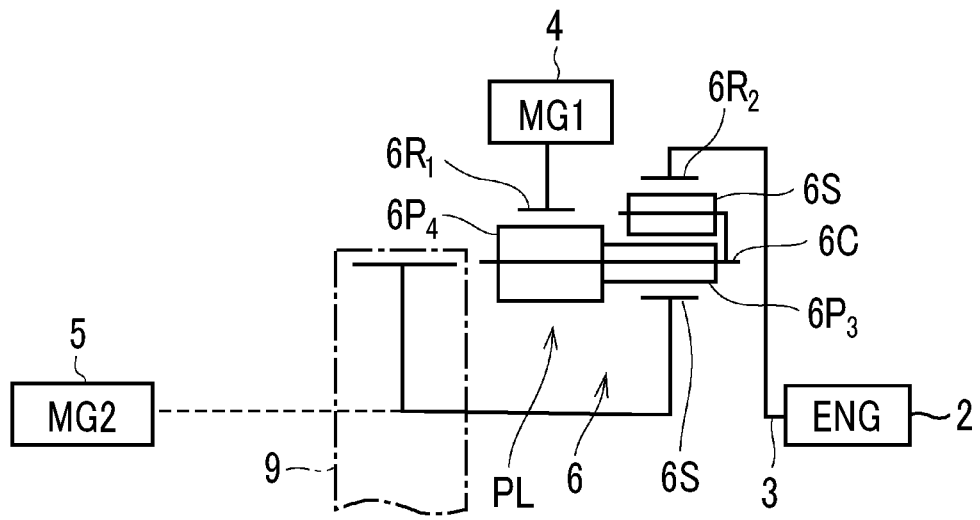
FIG. 19A is a schematic view showing another reference example of a power split device being a Ravigneaux planetary gear mechanism.
Figure 19B:
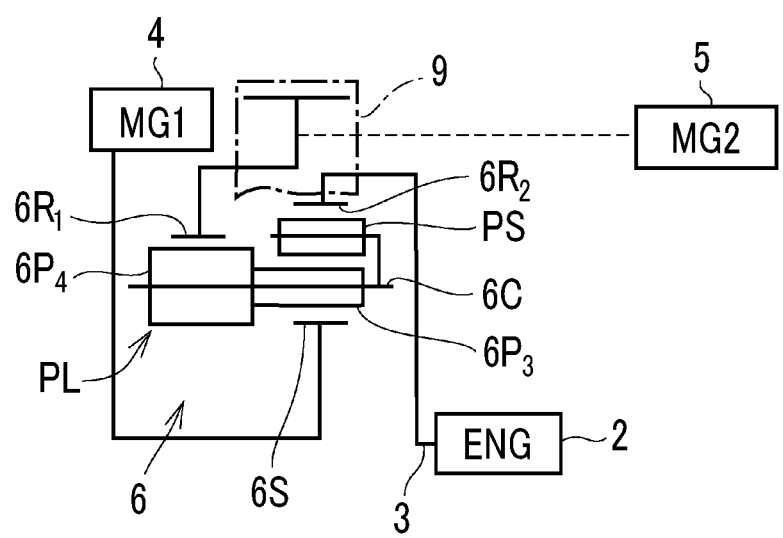
FIG. 19B is a schematic view showing another reference example of the power split device being the Ravigneaux planetary gear mechanism.

Examples shown in FIGS. 19A and 19B are an example where a power split device 6 is a Ravigneaux planetary gear mechanism in which a sun gear 6S is provided to mesh with small-diameter pinion gears $6P_3$ unlike the sun gear 6S shown in FIGS. 18A to 18C, and in addition, first and second ring gears $6R_1$, $6R_2$ are provided. In the example shown in FIG. 19A, the sun gear 6S serves as an output element and is coupled to the first speed reduction unit 9, the first ring gear $6R_1$ meshes with a large-diameter pinion gears $6P_4$, serves as a reaction element, and is coupled to the first motor 4, and in addition, the second ring gear $6R_2$ meshes with a short pinion gears PS, serves as an input element, and is coupled to the output shaft 3 of the engine 2. The example shown in FIG. 19B is an example where, in the configuration shown in FIG. 19A described above, the sun gear 6S is changed to a reaction element and is coupled to the first motor 4, and the first ring gear $6R_1$ is changed to an output element and is coupled to the first speed reduction unit 9.

Figure 20A:
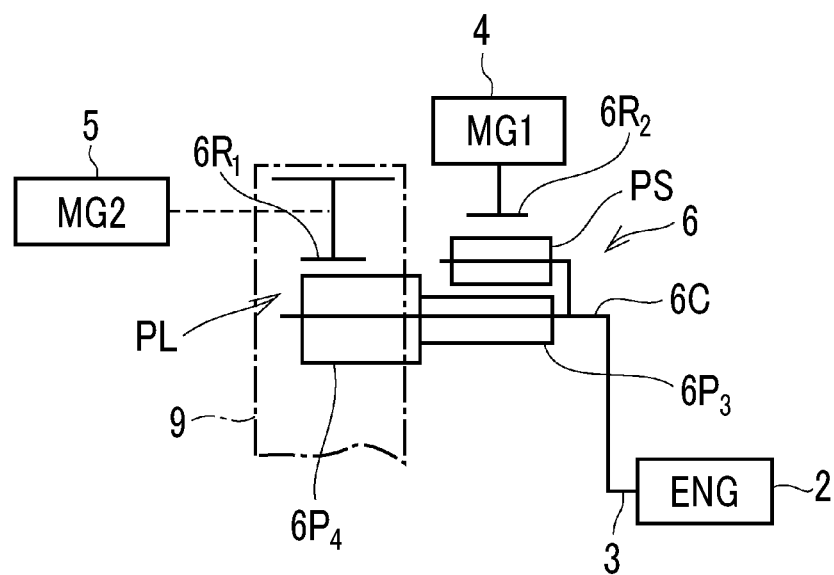
FIG. 20A is a schematic view showing another reference example of a power split device being a Ravigneaux planetary gear mechanism.
Figure 20B:
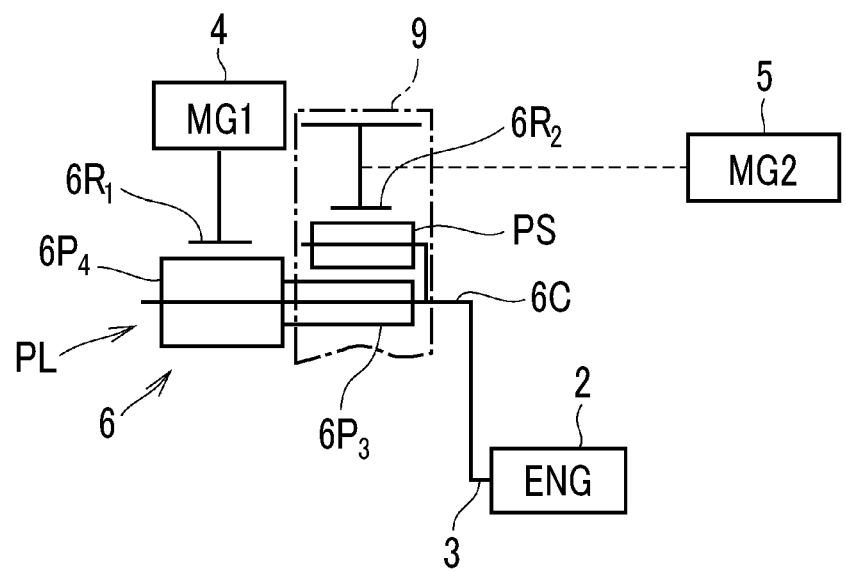
FIG. 20B is a schematic view showing another reference example of the power split device being the Ravigneaux planetary gear mechanism.

In addition, examples shown in FIGS. 20A and 20B are an example where a power split device 6 is a Ravigneaux planetary gear mechanism in which a sun gear is not provided and a carrier, a first ring gear, and a second ring gear are rotating elements. In the examples shown in FIGS. 20A and 20B, a carrier 6C that retains long pinion gears PL and short pinion gears PS serves as an input element and is coupled to the output shaft 3 of the engine 2. Then, in the example shown in FIG. 20A, a first ring gear $6R_1$ that meshes with large-diameter pinion gears $6P_4$ serve as an output element are coupled to the first speed reduction unit 9, and a second ring gear $6R_2$ that meshes with the short pinion gears PS serve as a reaction element and are coupled to the first motor 4. In contrast, in the example shown in FIG. 20B, the first ring gear $6R_1$ that meshes with the large-diameter pinion gears $6P_4$ serve as a reaction element and are coupled to the first motor 4, and the second ring gear 6R₂ that meshes with the short pinion gears PS serve as an output element and are coupled to the first speed reduction unit 9.

In all of the examples shown in FIGS. 18A to 20B, the gear ratio of the planetary gear mechanism is appropriately set, whereby the increase ratio that is the ratio of the rotation speed of the output element to the rotation speed of the input element in a case where the reaction element is fixed is made large. For this reason, as in each embodiment described above, it is possible to reduce the size of the configuration of the second motor 5 or the drive device 1 as a whole by making the so-called downstream-side speed reduction ratio large while maintaining the total speed reduction ratio to a desirable value in design. It is also possible to increase the degree of freedom for disposing the second motor 5.

An example where a power split device 6 is a Ravigneaux planetary gear mechanism with short pinion gears PS disposed on an inner peripheral side from long pinion gears PL will be described. In examples described below, the short pinion gears PS are disposed on an inner peripheral side of small-diameter pinion gears 6P₃ in the long pinion gears PL and meshes with the small-diameter pinion gears 6P₃, and the pinion gears PL, PS are rotatably and revolvably retained by a carrier 6C.

Figure 21A:
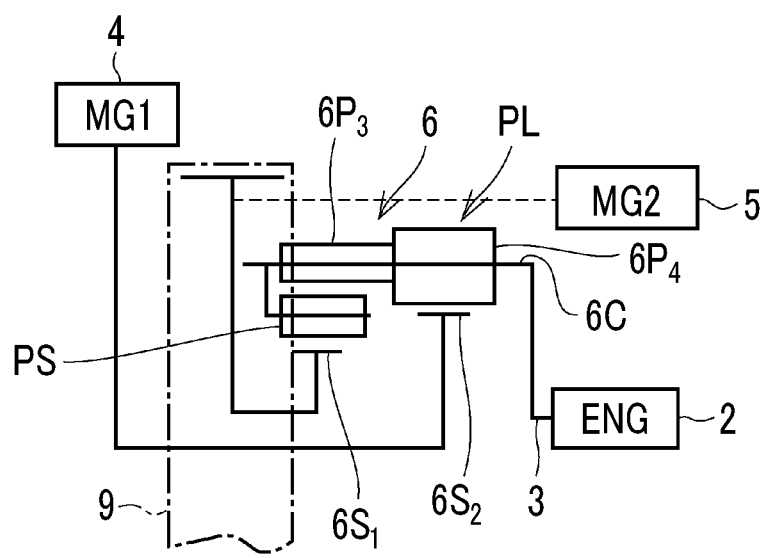
FIG. 21A is a schematic view showing another reference example of a power split device being a Ravigneaux planetary gear mechanism.
Figure 21B:
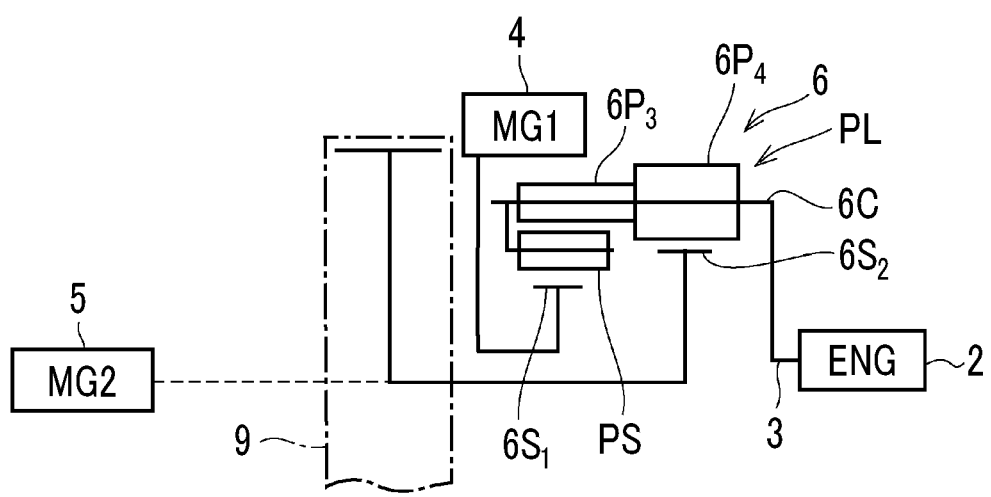
FIG. 21B is a schematic view showing another reference example of the power split device being the Ravigneaux planetary gear mechanism.

In examples shown in FIGS. 21A and 21B, a carrier 6C serves as an input element and is coupled to the output shaft 3 of the engine 2. In addition to the carrier 6C, a first sun gear 6S₁ that meshes with short pinion gears PS and a second sun gear 6S₂ that meshes with large-diameter pinion gears 6P₄ are further provided as rotating elements. Then, in the example shown in FIG. 21A, the first sun gear 6S₁ serves as an output element and is coupled to the first speed reduction unit 9, and the second sun gear 6S₂ serves as a reaction element and is coupled to the first motor 4. In contrast, in the example shown in FIG. 21B, the first sun gear 6S₁ serves as a reaction element and is coupled to the first motor 4, and the second sun gear 6S₂ serves as an output element and is coupled to the first speed reduction unit 9.

Figure 22A:
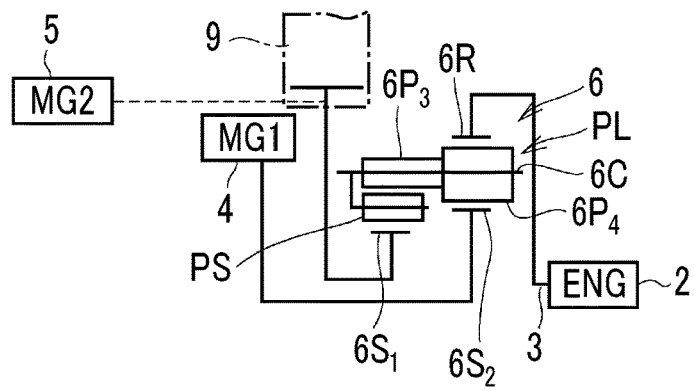
FIG. 22A is a schematic view showing another reference example of a power split device being a Ravigneaux planetary gear mechanism.
Figure 22B:
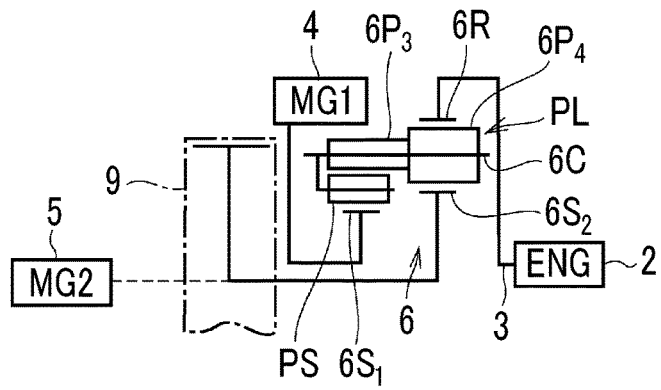
FIG. 22B is a schematic view showing another reference example of the power split device being the Ravigneaux planetary gear mechanism.
Figure 22C:
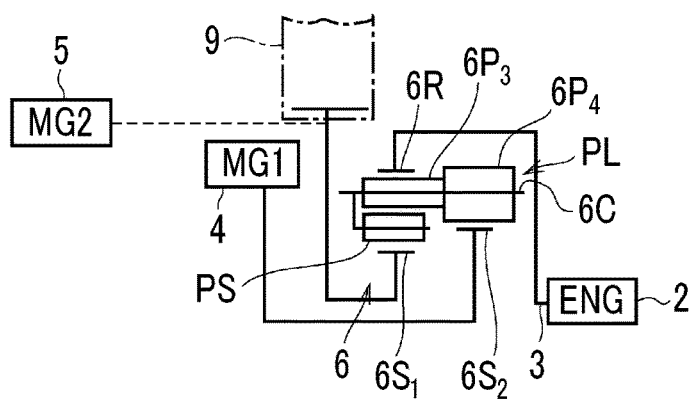
FIG. 22C is a schematic view showing another reference example of the power split device being the Ravigneaux planetary gear mechanism.
Figure 22D:
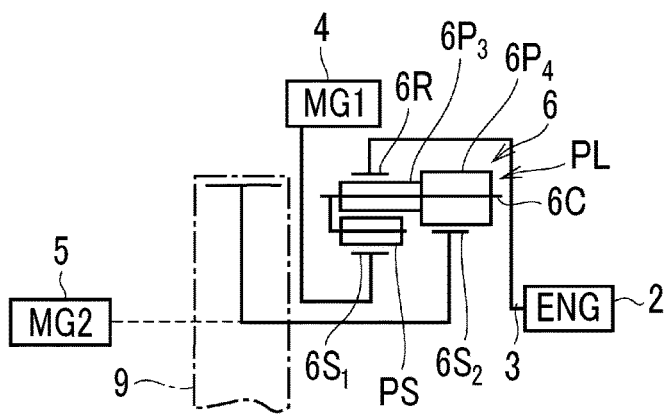
FIG. 22D is a schematic view showing another reference example of the power split device being the Ravigneaux planetary gear mechanism.

Examples shown in FIGS. 22A to 22D are an example where a ring gear 6R to be an input element is provided in place of the carrier 6C in the configuration shown in FIGS. 21A and 21B described above. That is, in the example shown in FIG. 22A, the ring gear 6R that meshes with large-diameter pinion gears 6P₄ is provided, and the ring gear 6R is coupled to the output shaft 3 of the engine 2 in place of the carrier 6C. Other configurations are the same as the configurations shown in FIG. 21A described above. The example shown in FIG. 22B is an example where, in the configuration shown in FIG. 22A, an output element and a reaction element are replaced with each other. That is, the first sun gear 6S₁ that meshes with the small-diameter pinion gears 6P₃ is coupled to the first motor 4 and serves as a reaction element, and the second sun gear 6S₂ that meshes with the large-diameter pinion gears 6P₄ is coupled to the first speed reduction unit 9 and serves as an output element. The example shown in FIG. 22C is an example where, in the configuration shown in FIG. 22A described above, the ring gear 6R meshes with the small-diameter pinion gears 6P₃ and the ring gear 6R serves as an input element. Similarly, the example shown in FIG. 22D is an example where, in the configuration shown in FIG. 22B described above, the ring gear 6R meshes with the small-diameter pinion gears 6P₃ and the ring gear 6R serves as an input element.

Figure 23:
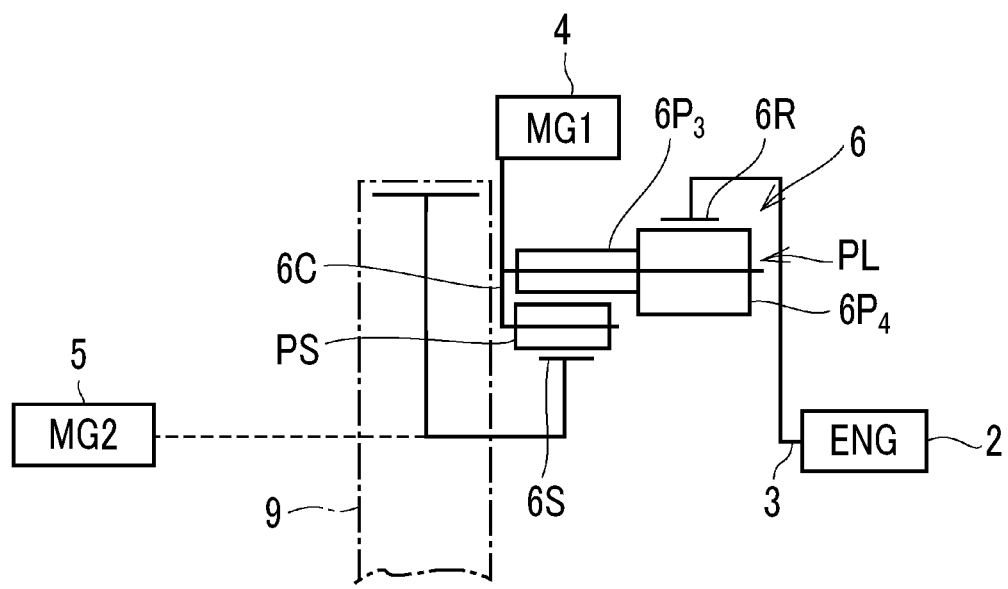
FIG. 23 is a schematic view showing another reference example of a power split device being a Ravigneaux planetary gear mechanism.

An example shown in FIG. 23 is an example where a ring gear 6R that meshes with large-diameter pinion gears 6P₄ is provided, the ring gear 6R is coupled to the output shaft 3 of the engine 2 to serve as an input element, and in addition, a sun gear 6S and a carrier 6C that mesh with a short pinion gears PS serve as rotating elements. In the example, the carrier 6C serves as a reaction element and is coupled to the first motor 4, and the sun gear 6S serves as an output element and is coupled to the first speed reduction unit 9.

Figure 24A:
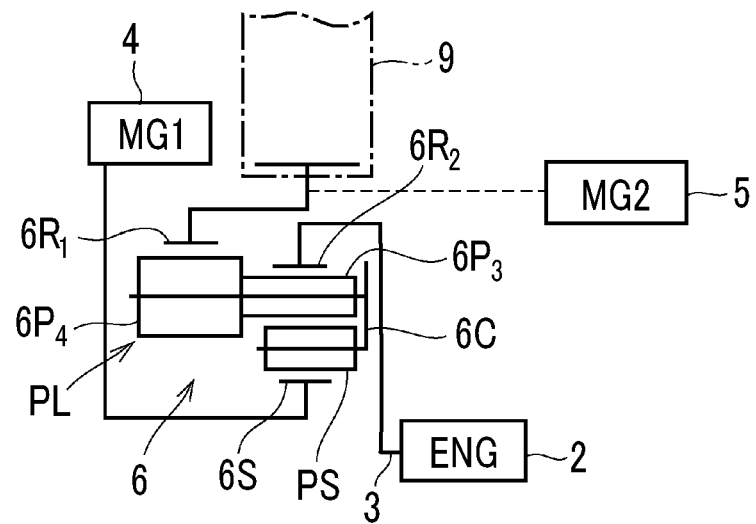
FIG. 24A is a schematic view showing another reference example of a power split device being a Ravigneaux planetary gear mechanism.
Figure 24B:
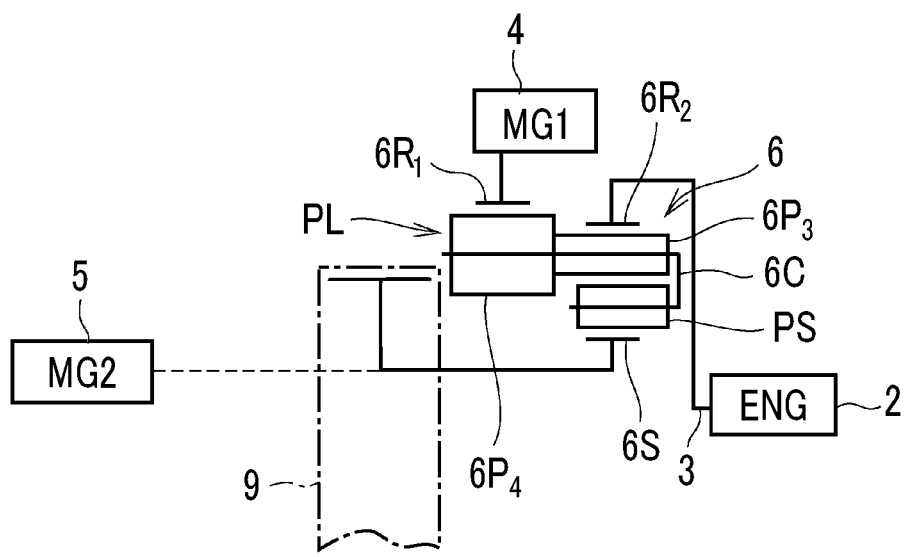
FIG. 24B is a schematic view showing another reference example of the power split device being the Ravigneaux planetary gear mechanism.

Examples of FIGS. 24A and 24B are an example where a first ring gear 6R₁ that meshes with small-diameter pinion gears 6P₃ is provided, the first ring gear 6R₁ is coupled to the output shaft 3 of the engine 2 to serve as an input element, and in advance, a second ring gear 6R₂ that meshes with large-diameter pinion gears 6P₄ and a sun gear 6S that meshes with short pinion gears PS serve as rotating elements. In the example shown in FIG. 24A, the second ring gear 6R₂ serves as an output element and is coupled to the first speed reduction unit 9, and the sun gear 6S serves as a reaction element and is coupled to the first motor 4. In contrast, in the example shown in FIG. 24B, the second ring gear 6R₂ serves as a reaction element and is coupled to the first motor 4, and the sun gear 6S serves as an output element and is coupled to the first speed reduction unit 9.

In all of the examples shown in FIGS. 21A and 24B, the gear ratio of the planetary gear mechanism is appropriately set, whereby the increase ratio that is the ratio of the rotation speed of the output element to the rotation speed of the input element in a case where the reaction element is fixed is made large. For this reason, as in each embodiment described above, it is possible to reduce the size of the configuration of the second motor 5 or the drive device 1 as a whole by making the so-called downstream-side speed reduction ratio large while maintaining the total speed reduction ratio to a desirable value in design. It is also possible to increase the degree of freedom for disposing the second motor 5.

The disclosure is not limited to the above-described embodiments, the first speed reduction unit may be a gear type speed reduction mechanism, and the second speed reduction unit may be a winding power transmission mechanism.

What is claimed is:

1. A drive device for a hybrid vehicle, the drive device comprising:
    an engine;
    a first motor configured to generate electric power;
    a power split device configured to split drive power output from the engine into drive power to be transmitted to a first motor side and drive power to be transmitted to a drive wheel side, the power split device being a planetary gear mechanism, the planetary gear mechanism including rotating elements that include a sun gear, a ring gear disposed so as to be concentric with the sun gear, and a carrier, the carrier retaining pinion gears that mesh with the sun gear and the ring gear, and the sun gear being an output element that outputs torque;
    a differential gear as a final drive gear configured to transmit torque to the drive wheel;
    a second motor coupled to the sun gear, the second motor being configured to increase or decrease torque output from the power split device and to be transmitted to the differential gear;
    a first speed reduction unit coupled to the sun gear, wherein a winding power transmission mechanism with a drive-side rotor, an annular power transmission member and a driven-side rotor or a chain power transmission mechanism is employed for the first speed reduction unit; and
    a second speed reduction unit provided between the first speed reduction unit and the differential gear.

2. The drive device according to claim 1, wherein:
the power split device is a single-pinion planetary gear mechanism including the pinion gears that mesh with the sun gear and the ring gear, and are retained by the carrier;
the carrier is an input element coupled to the engine; and
the ring gear is a reaction element coupled to the first motor.

3. The drive device according to claim 1, wherein:
the power split device is a double-pinion planetary gear mechanism including, as rotating elements, the sun gear, the ring gear disposed so as to be concentric with the sun gear, and the carrier retaining first pinion gears and second pinion gears;
the first pinion gears mesh with the sun gear;
the second pinion gears mesh with the first pinion gears and the ring gear;
the ring gear is an input element coupled to the engine; and
the carrier is a reaction element coupled to the first motor.

4. The drive device according to claim 1, wherein:
the first speed reduction unit is the winding power transmission mechanism including the drive-side rotor, the annular power transmission member, and the driven-side rotor;
the drive-side rotor is configured to rotate along with the output element;
the power transmission member is wound on the drive-side rotor and the driven-side rotor; and
the driven-side rotor has a winding diameter greater than a winding diameter of the drive-side rotor.

5. The drive device according to claim 4, wherein:
the drive-side rotor is a drive-side chain sprocket;
the power transmission member is a chain; and
the driven-side rotor is a driven-side chain sprocket.

6. The drive device according to claim 5, wherein the drive-side chain sprocket and the driven-side chain sprocket are rotatably supported by a needle bearing.

7. The drive device according to claim 4, wherein:
the differential gear includes a differential case;
the second speed reduction unit includes an input member, a fixed member, and an output member, and the second speed reduction unit is configured to perform differential action by using the input member, the fixed member, and the output member;
the second speed reduction unit is a differential rotation mechanism in which the output member rotates in the same direction as the input member and at a speed lower than the input member in a state where rotation of the fixed member is stopped;
the driven-side rotor is coupled to the input member;
the fixed member is non-rotatably fixed; and
the differential case is coupled to the output member.

8. The drive device according to claim 1, wherein:
the second speed reduction unit is disposed to be offset with respect to the first speed reduction unit in a direction of a rotation center axis of the first speed reduction unit; and
the differential gear is disposed to be offset from the second speed reduction unit in the direction of the rotation center axis of the first speed reduction unit, such that the differential gear is on an opposite side of the second speed reduction unit from the first speed reduction unit.

9. The drive device according to claim 4, wherein:
the first motor, the power split device, the drive-side rotor, and the second motor are disposed in parallel on the same axis; and
the first motor and the power split device are arranged in the order from the engine side.

10. The drive device according to claim 1, wherein:
the second speed reduction unit is a second parallel gear speed reduction mechanism including a counter drive gear and a differential ring gear;
the counter drive gear rotates integrally with the counter driven gear and has a diameter smaller than a diameter of the counter driven gear;
the differential ring gear meshes with the counter drive gear and has a diameter greater than the diameter of the counter drive gear; and
the differential ring gear is provided in the differential gear.

* * * * *